(12) United States Patent
Li et al.

(10) Patent No.: US 8,908,845 B2
(45) Date of Patent: Dec. 9, 2014

(54) METHOD, DEVICE AND SYSTEM FOR IMPLEMENTING CUSTOMIZED RING BACK TONE SERVICE AND CUSTOMIZED RING TONE SERVICE

(75) Inventors: Li Li, Shenzhen (CN); Ruinan Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 233 days.

(21) Appl. No.: 13/568,742

(22) Filed: Aug. 7, 2012

(65) Prior Publication Data
US 2013/0034222 A1    Feb. 7, 2013

Related U.S. Application Data

(63) Continuation of application No. PCT/CN2011/070869, filed on Feb. 1, 2011.

(30) Foreign Application Priority Data

Feb. 8, 2010    (CN) .......................... 2010 1 0110112

(51) Int. Cl.
*H04M 3/42* (2006.01)
*H04M 1/64* (2006.01)
*H04L 29/06* (2006.01)

(52) U.S. Cl.
CPC ....... *H04M 3/42017* (2013.01); *H04L 65/1016* (2013.01); *H04L 65/1069* (2013.01); *H04L 65/1096* (2013.01)
USPC .............. 379/207.16; 379/88.11; 379/201.01; 379/210.01

(58) Field of Classification Search
CPC ...... H04M 3/42017; H04M 3/02; H04M 3/42
USPC .................. 379/207.16, 257, 201.01, 210.01, 379/88.11, 88.22
See application file for complete search history.

(56) References Cited

U.S. PATENT DOCUMENTS 8,379,824 B2 *    2/2013    Jackson et al. ........... 379/207.16
2010/0061541 A1    3/2010    Ke et al.
2013/0259220 A1*   10/2013   Wu et al. ....................... 379/257

FOREIGN PATENT DOCUMENTS

CN    101009575 A    8/2007
CN    101043647 A    9/2007

(Continued)

OTHER PUBLICATIONS

Extended European Search Report in corresponding European Patent Application No. 11739412.2 (Dec. 18, 2012).
Handley et al., "RFC-4566; SDP: Session Description Protocol," Standards Track Memo, Jul. 2006, The Internet Society, Reston, Virginia.
International Search Report in corresponding International Patent Application No. PCT/CN2011/070869 (May 12, 2011).

(Continued)

*Primary Examiner* — Thjuan K Addy
(74) *Attorney, Agent, or Firm* — Leydig, Voit & Mayer, Ltd.

(57) ABSTRACT

A method, device and system for implementing a customized ring back tone service and a customized ring tone service are disclosed. The method includes: a second server receives a first early media response returned by a terminal comprising a first media negotiation result which is obtained by the terminal performing media negotiation with a first server according to a first early media request; the second server generates a second early media request according to the received first early media response comprising a second attribute identification for identifying the second early media request, and sends the first early media response and the second early media request; the first server completes the media negotiation with the calling terminal according to the first early media response and a called terminal completes the media negotiation with the second server according to the second early media request.

17 Claims, 24 Drawing Sheets

(56) References Cited

FOREIGN PATENT DOCUMENTS

| | | |
|---|---|---|
| CN | 101217698 A | 7/2008 |
| CN | 101227303 A | 7/2008 |
| CN | 101267597 A | 9/2008 |
| CN | 101287170 A | 10/2008 |
| CN | 101374259 A | 2/2009 |
| EP | 2107714 A1 | 2/2008 |

OTHER PUBLICATIONS

Written Opinion of the International Searching Authority in corresponding International Patent Application No. PCT/CN2011/070869 (May 12, 2011).

"C1-095243—Issue and Solutions for CRS Interact with CAT on Early-Session Model," 3GPP TSG CT WG1 Meeting #62, Nov. 9-13, 2009, 3GPP, Valbonne, France.

1st Office Action in corresponding Chinese Patent Application No. 201010110112.4 (Apr. 3, 2013).

* cited by examiner

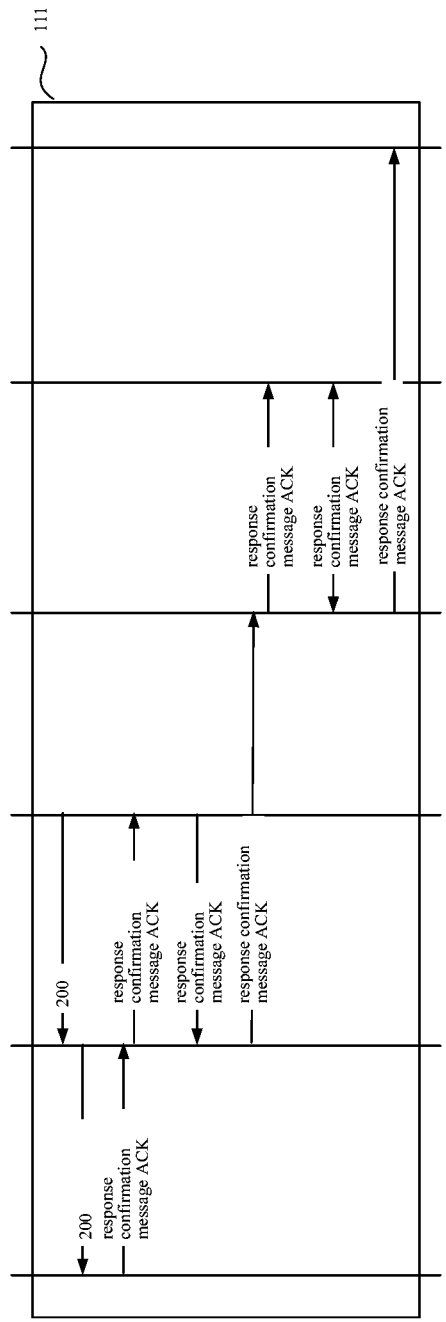

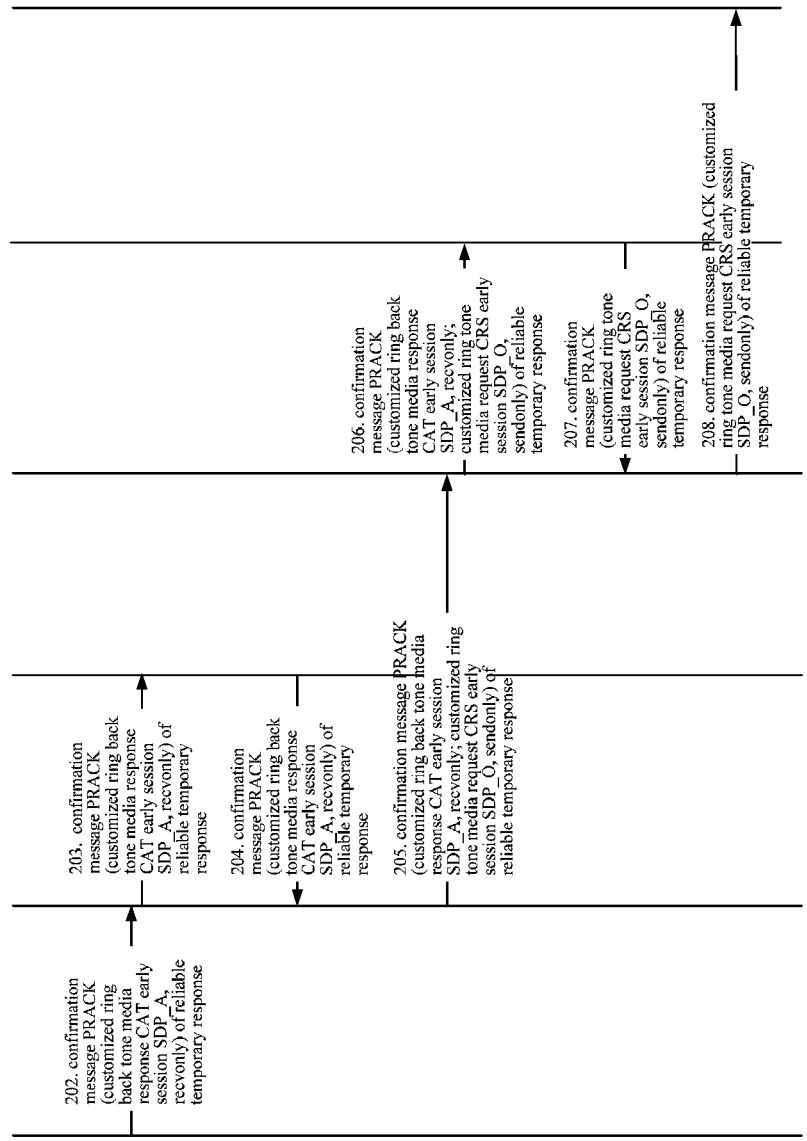

METHOD, DEVICE AND SYSTEM FOR IMPLEMENTING CUSTOMIZED RING BACK TONE SERVICE AND CUSTOMIZED RING TONE SERVICE

CROSS-REFERENCES TO RELATED APPLICATIONS

This application is a continuation of International Application No. PCT/CN2011/070869, filed on Feb. 1, 2011, which claims the priority of Chinese Patent Application No. 201010110112.4, filed Feb. 8, 2010, both of which are hereby incorporated by reference in their entireties.

FIELD OF THE TECHNOLOGY

This invention relates to the field of communications, and more particularly to a method, device and system for implementing customized ring back tone service and customized ring tone service.

BACKGROUND OF THE INVENTION

The IMS (IP multimedia subsystem) customized ring back tone service is a type of service that is customized by a calling user or a called user and provides the calling user with a piece of melodious music, a phrase of greeting, a picture or a video image, etc. instead of the ordinarily beeping ring back tone. Accordingly, if the calling user or the called user is a user of customized ring back tone, the calling user hears or sees the personalized customized ring back tone customized by the user when dialing the telephone number of the called user. The IMS customized ring tone service is a type of service that is customized by a calling user or a called user and provides the called user with a piece of melodious music, a phrase of greeting, a picture or a video image, etc. instead of the ordinarily beeping ringing tone when the called user receives a call from the calling user. Accordingly, if the calling user or the called user is a user of customized ring tone, the called user hears or sees the personalized customized ring tone customized by the user when receiving a telephone call from the calling user.

Existing IMS customized ring back tones can be implemented by the mode of early session. With regard to the IMS customized ring tones, the early session mode is also defined as one of the implementation modes. During the process of the same session, if the calling user and the called user both customize the customized ring back tone and the customized ring tone services, and the customized ring back tone and the customized ring tone are both implemented by the early session mode, during the process of signaling transmission, two content-dispositions which are simultaneously contained in the message body of a signaling message are both the SDPs, Session Description Protocol, of the early session. Under such circumstances, it is impossible for the customized ring back tone server to identify which one thereof is the SDP answer for the customized ring back tone service sent from the calling terminal, and it is hence impossible to perform media negotiation with the calling terminal to play the customized ring back tone; it is also impossible for the customized ring tone server to identify which one thereof is the SDP answer for the customized ring tone service sent from the called terminal, and it is hence impossible to perform media negotiation with the called terminal to play the customized ring tone.

SUMMARY OF THE INVENTION

Embodiments of the present invention provide a method for implementing customized ring back tone service and customized ring tone service, comprising: a second server receiving a first early media response returned by a terminal, wherein the first early media response comprises a first media negotiation result which is obtained by the terminal performing media negotiation with a first server according to a first early media request; the second server generating a second early media request according to the received first early media response, wherein the second early media response comprises a second attribute identification for identifying the second early media request, and sending the first early media response and the second early media request; and the first server completing media negotiation with a calling terminal according to the first early media response, and a called terminal completing media negotiation with the second server according to the second early media request comprising the second attribute identification.

Embodiments of the present invention provide a server for implementing customized ring back tone service, comprising: a terminal interacting unit, for performing message interaction with a terminal; a server interacting unit, for performing message interaction with a server; and a processor, for instructing the server interacting unit to send a first early media request for performing media negotiation with the terminal, parsing a first early media response for the first early media request according to the first early media response and a second early media request received by the server interacting unit, and completing media negotiation according to the first early media response, wherein the second early media request comprises a second attribute identification for identifying the second early media request.

Embodiments of the present invention provide a terminal for implementing customized ring back tone service and customized ring tone service, comprising: a server interacting unit, for performing message interaction with a server; and a processing unit, for performing media negotiation according to an early media request received by the server interacting unit from a server to obtain a media negotiation result, sending an early media response via the server interacting unit, and completing media negotiation, wherein the early media response comprises the media negotiation result.

Embodiments of the present invention provide a server for implementing customized ring back tone service and customized ring tone service, comprising: a terminal interacting unit, for performing message interaction with a terminal; a server interacting unit, for performing message interaction with a server; and a processor, for generating a second early media request when the terminal interacting unit receives a first early media response sent by the terminal, sending the first early media response and the second early media request via the server interacting unit, and completing media negotiation, wherein the second early media request comprises a second attribute identification for identifying the second early media request.

Embodiments of the present invention provide a system for implementing customized ring back tone service and customized ring tone service, comprising: a customized ring back tone server and a customized ring tone server, wherein the customized ring tone server receives a first early media response returned by a calling terminal, wherein the first early media response comprises a first media negotiation result which is obtained by a terminal performing media negotiation with the customized ring back tone server according to the first early media request; the customized ring tone server generates a second early media request according to the received first early media response, and send the first early media response and the second early media request, wherein the second early media request comprises a second attribute identification for identifying the second early media request; and the customized ring back tone server completes media negotiation with the calling terminal according to the first early media response, and the customized ring tone server completes media negotiation with a called terminal according to the second early media request comprising the second attribute identification.

Embodiments of the present invention provide a method for implementing customized ring back tone service and customized ring tone service, comprising: a first server receiving a request, generating an early media request according to the request, sending a first early media request to a terminal, and enabling the terminal to perform media negotiation with a server, wherein the first early media request comprises a first attribute identification for identifying the first early media request.

Embodiments of the present invention provide a server for implementing customized ring back tone service and customized ring tone service, comprising: a terminal interacting unit, for performing message interaction with a terminal; and a processor, for generating an early media request, sending a first early media request to the terminal, and enabling the terminal to perform media negotiation with a server, wherein the first early media request comprises a first attribute identification for identifying the first early media request.

It is possible, through the embodiments of the present invention, to enable a network element such as a customized ring back tone server or a customized ring tone server to very easily identify the two SDPs simultaneously contained in a received request, and identify the service that belongs to the services needed to be processed by the server itself on the basis that the existing SIP and SDP protocols are not extended. When the customized ring back tone service and the customized ring tone service coexist, and both of the services are provided using the early session mode, the customized ring back tone server can perform normal media transmission of customized ring back tone with the calling terminal, and the customized ring tone server can perform media transmission with the called terminal.

BRIEF DESCRIPTION OF THE DRAWINGS

FIGS. 1A-1F illustrate a scenario of the calling flow of customized ring back tone and customized ring tone services provided by embodiments of the present invention;

FIGS. 2A-2F illustrate an embodiment of a method for implementing customized ring back tone service and customized ring tone service provided by the present invention;

DETAILED DESCRIPTION OF THE EMBODIMENTS

Figure 1A:
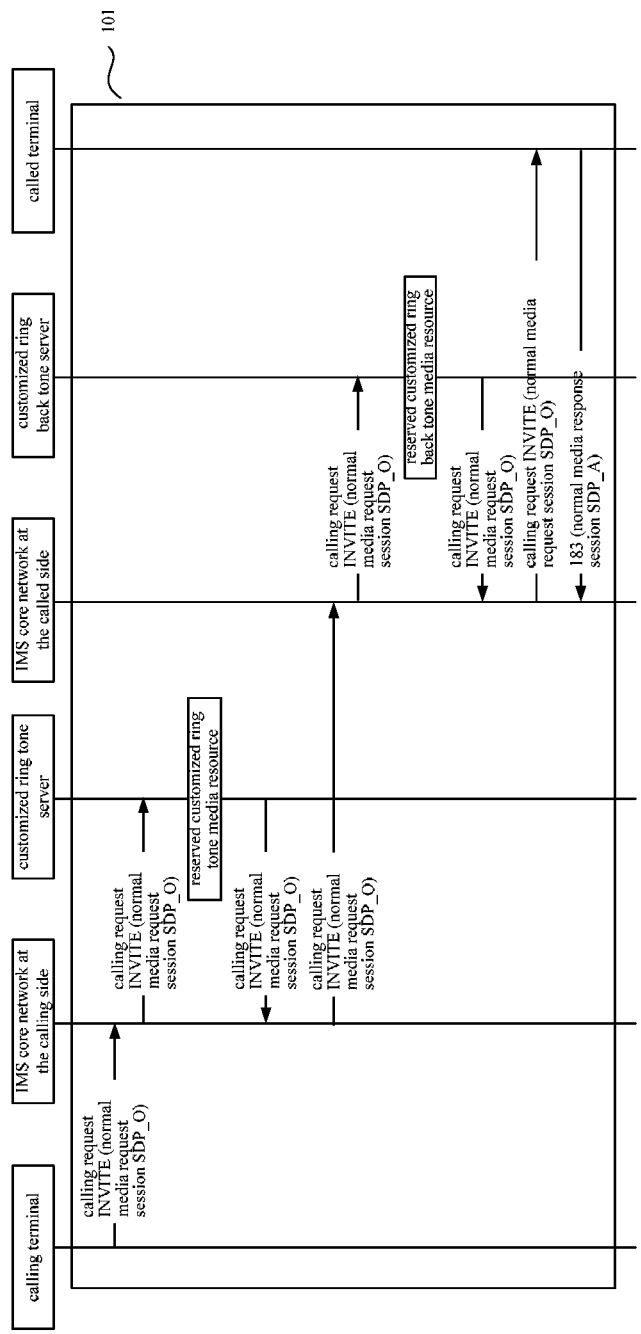
Figure 1B:
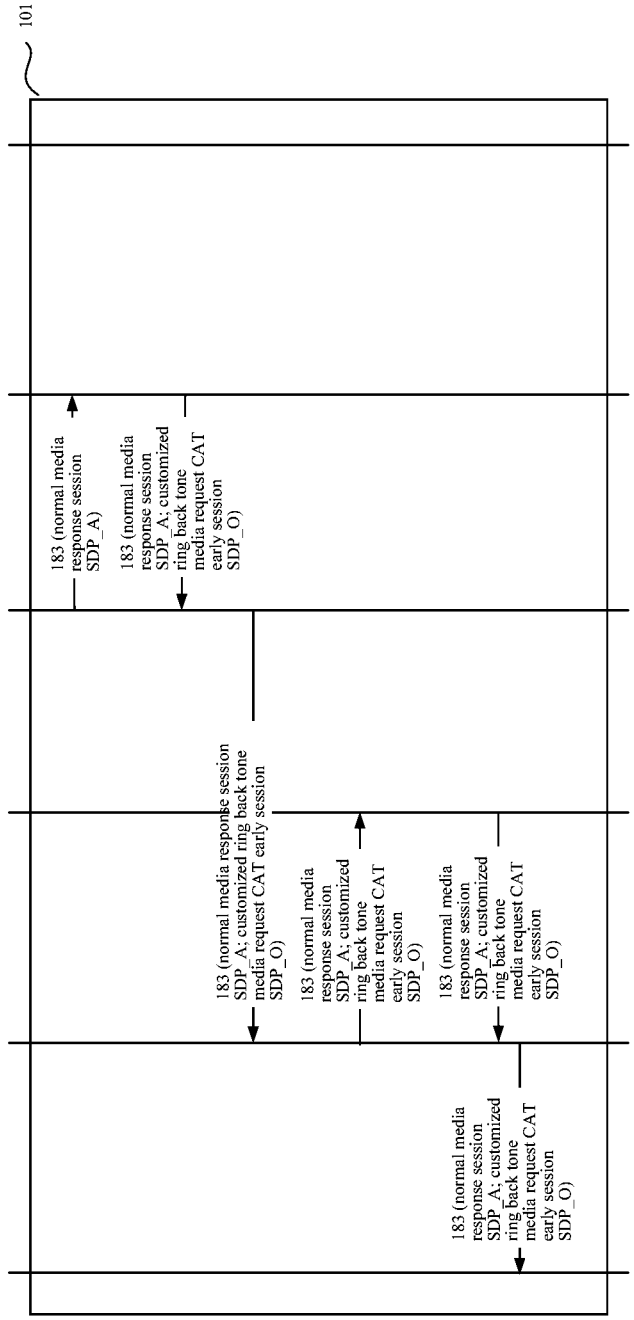
Figure 1C:
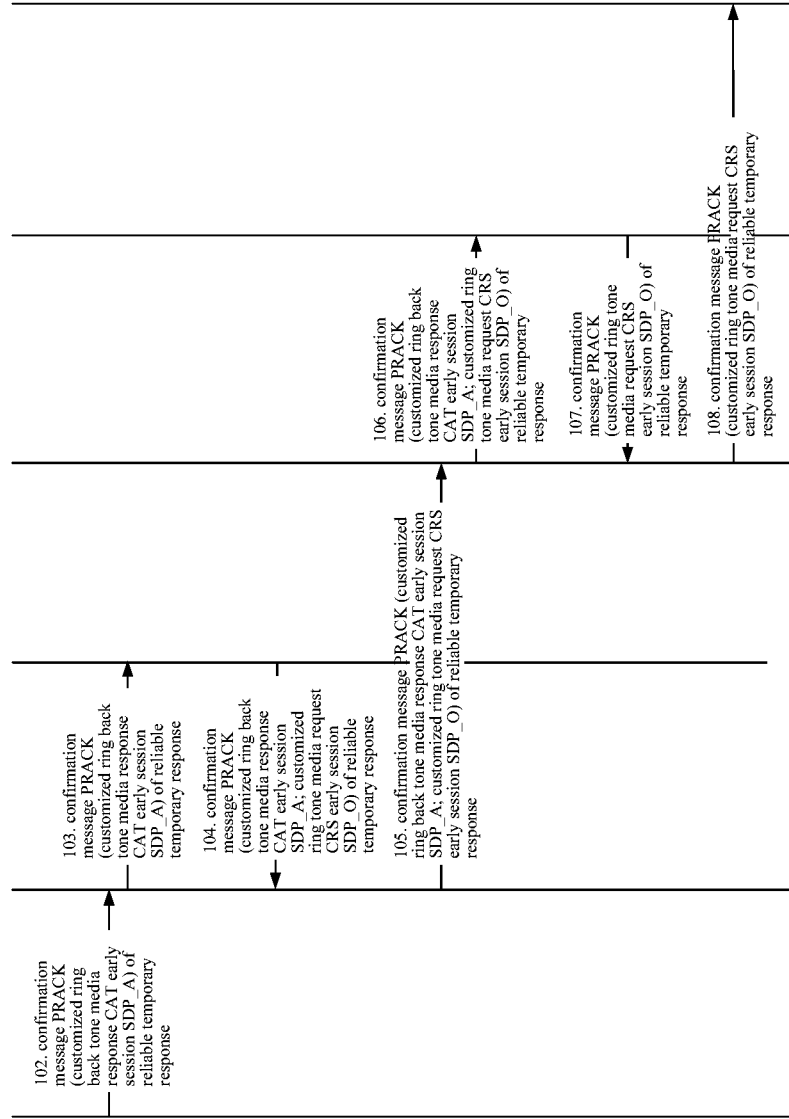
Figure 1D:
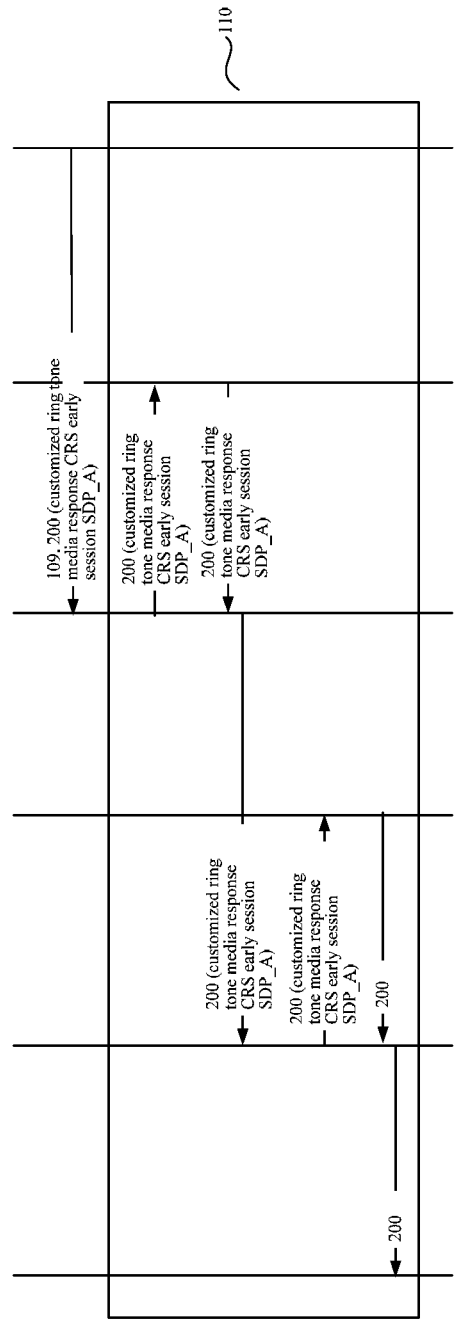
Figure 1E:
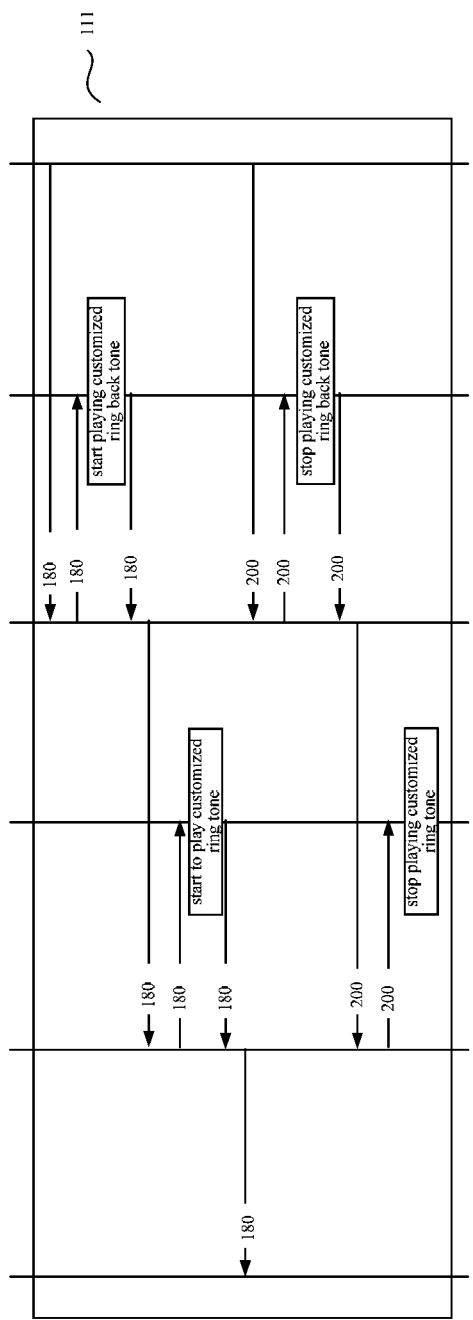
Figure 2A:
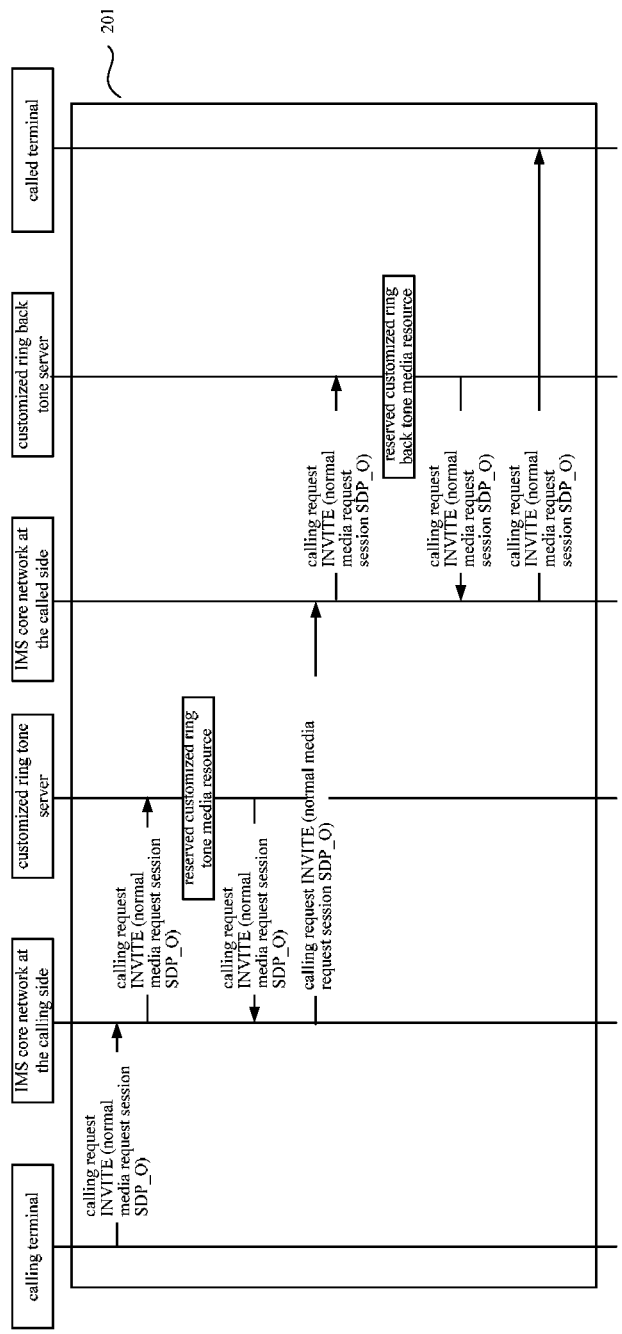
Figure 2B:
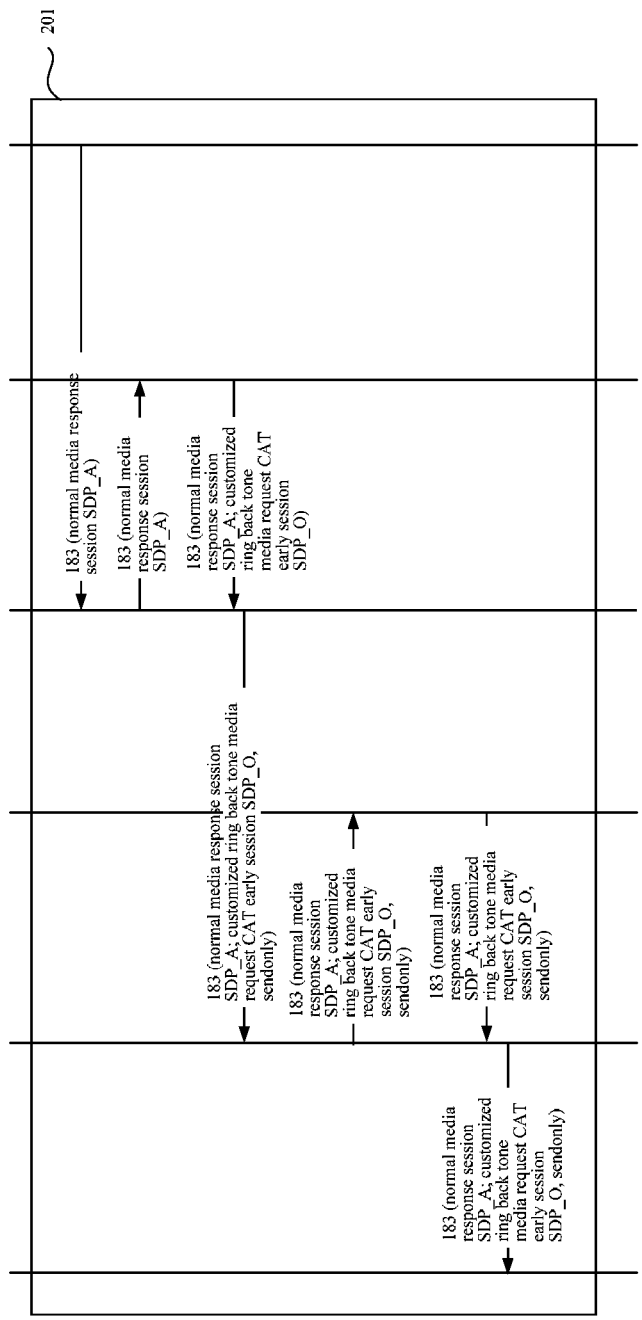
Figure 2D:
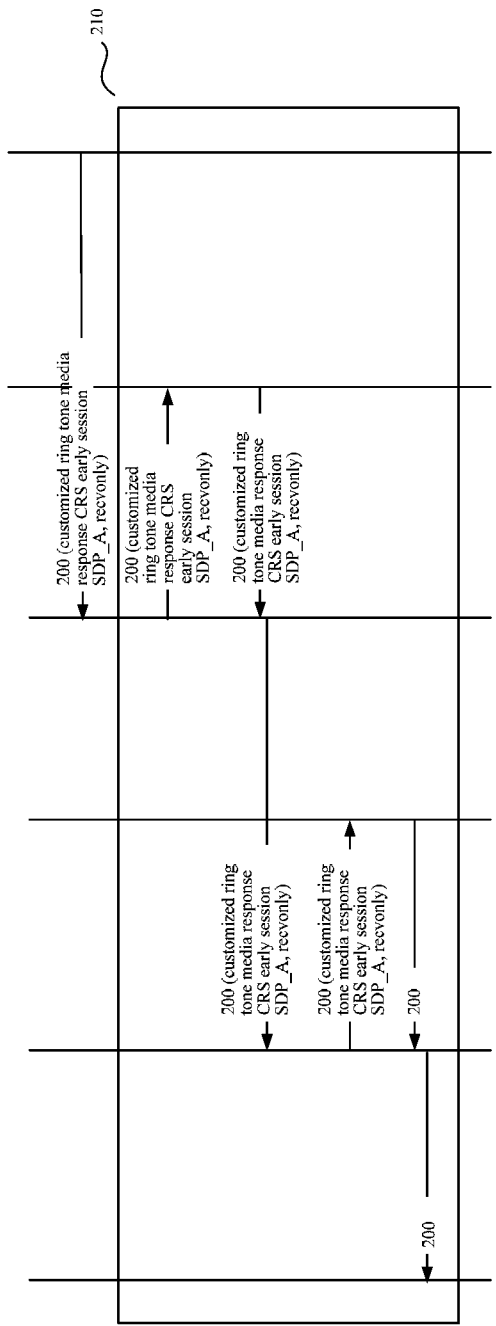
Figure 2E:
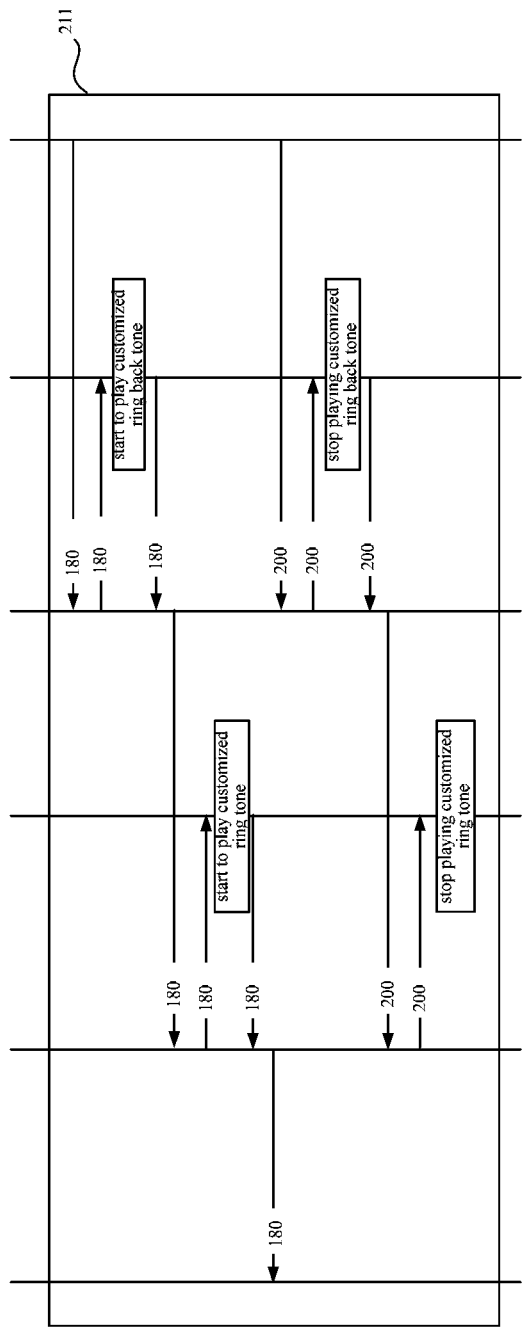
Figure 2F:
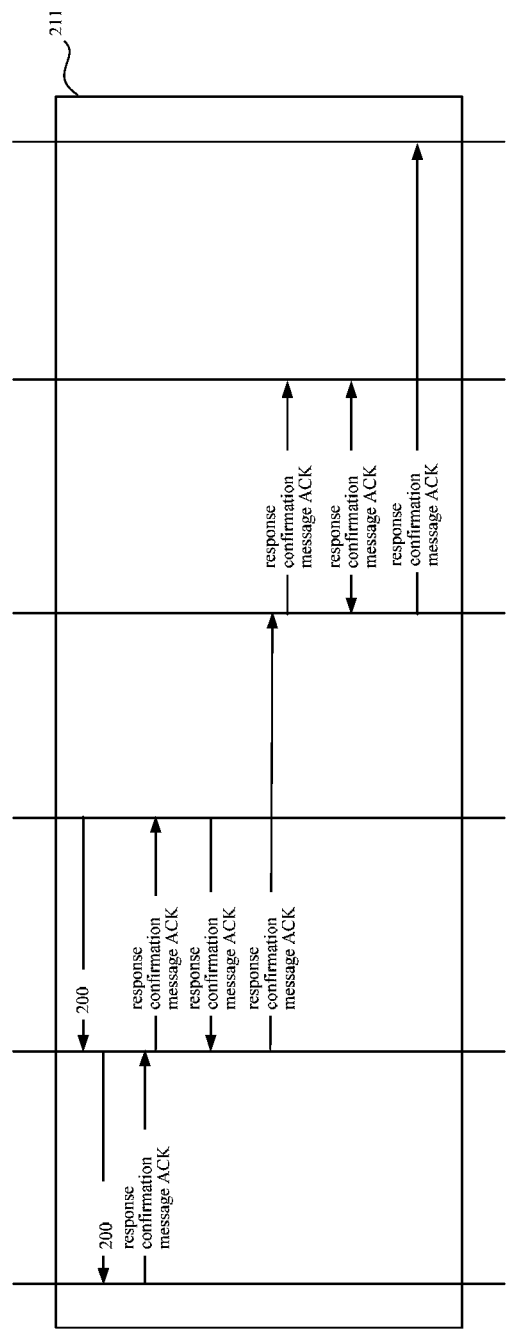

Embodiments of the present invention will be described in detail below in combination with the accompanying drawings, so as to more clearly explain the technical solutions of the embodiments of the present invention.

Embodiments of the present invention are applied to implementation of customized ring back tone and customized ring tone services, and FIG. 1A-1F illustrates a scenario of the calling flow of customized ring back tone and customized ring tone services provided by an embodiment of the present invention. In this embodiment, the calling user subscribes the customized ring tone service, and the called user subscribes the customized ring back tone service. Alternatively, the calling user or the called user subscribes the customized ring back tone service and the customized ring tone service, and the customized ring tone service has a higher trigger priority than that of the customized ring back tone service. The calling user calls the called user, with the calling flow specified below.

S101: the calling terminal sends a calling request, which contains calling terminal identification, called terminal identification, supporting early session capability tag and reliable response capability tag of the calling terminal.

After receiving the calling request sent from the calling terminal, the IMS core network at the calling side checks stored initial filtering rules corresponding to the calling terminal identification, and identifies the application server needed to process the calling request according to the initial filtering rule to which the calling request conforms. When determining that the initial filtering rule requires the customized ring tone server to process the calling request, the IMS core network at the calling side sends the calling request to the customized ring tone server.

After receiving the calling request, the customized ring tone server determines that the calling user subscribes the customized ring tone service according to the calling terminal identification in the calling request, and returns the calling request to the IMS core network at the calling side for continuing sending.

The IMS core network at the calling side determines the home IMS core network of the called user according to the called terminal identification contained in the calling request, and forwards the calling request to the IMS core network at the called side. After receiving the calling request sent from the IMS core network at the calling side, the IMS core network at the called side checks stored initial filtering rules corresponding to the called terminal identification, and identifies the application server needed to process the calling request according to the initial filtering rule to which the calling request conforms. When determining that the initial filtering rule requires the customized ring back tone server to process the calling request, the IMS core network at the calling side sends the calling request to the customized ring back tone server.

After receiving the calling request, the customized ring back tone server determines that the called user subscribes the customized ring back tone service according to the called terminal identification in the calling request, determines that the calling terminal supports customized ring back tone early media according to the supporting early session capability tag and the reliable response capability tag of the calling terminal contained in a Support header in the calling request, and returns the calling request to the IMS core network at the called side for continuing sending the calling request. The IMS core network at the called side forwards the calling request to the called terminal according to the called terminal identification contained in the calling request and the address asserted by the called terminal during registration.

After receiving the calling request, the called terminal performs normal media negotiation according to a normal media request (session SDP_O) in the calling request, and returns the response message to the IMS core network at the called side. The IMS core network at the called side forwards the response message to the customized ring back tone server according to a routing path for the calling request carried in the response message. After receiving a reliable temporary response 183 (session SDP_A) returned by the called terminal, the customized ring back tone server inserts in the response early session SDP representative of a customized ring back tone media request. The customized ring back tone server sends to the IMS core network at the called side the processed reliable temporary response 183 (session SDP_A; CAT early session SDP_O).

The IMS core network at the called side, the IMS core network at the calling side and the customized ring tone server send to the calling terminal the reliable temporary response 183 (session SDP_A; CAT early session SDP_O) according to the routing path for the calling request carried in the response message.

S102: the calling terminal sends to the IMS core network at the calling side a confirmation message PRACK for the 183 reliable temporary response, the message carrying therewith (CAT early session SDP_A).

After receiving the 183 response, the calling terminal performs customized ring back tone early media negotiation, wherein the negotiating method may be as follows: the calling terminal judges the media type and coding scheme etc. contained in the customized ring back tone early media request in the 183 response message, and performs matching according to its own capability. The calling terminal sends the confirmation message PRACK for the 183 reliable temporary response, wherein the message includes the response CAT early session SDP_A to the customized ring back tone early media request in the 183 reliable temporary response.

S103: the IMS core network at the calling side forwards the response message to the customized ring tone server according to a route set carried in the confirmation message PRACK for the 183 reliable temporary response.

S104: the customized ring tone server sends to the IMS core network at the calling side the processed confirmation message PRACK for the 183 reliable temporary response, the message carrying therewith (CAT early session SDP_A; CRS early session SDP_O).

After receiving the confirmation message PRACK for the reliable temporary response 180 returned by the calling terminal, the customized ring tone server inserts in the message early session SDP representative of a customized ring tone media request.

S105: the IMS core network at the calling side forwards the response message to the IMS core network at the called side according to the route set carried in the confirmation message PRACK for the 183 reliable temporary response.

S106: the IMS core network at the called side forwards the response message to the customized ring tone server according to the route set carried in the confirmation message PRACK for the 183 reliable temporary response.

S107: the customized ring back tone server detects that two content-dispositions simultaneously contained in the received PRACK request are both media requests (CAT early session SDP_A; CRS early session SDP_O) of early session; since the customized ring back tone service and the customized ring tone service may have the same type of media or even the same media coding format in the same call, the customized ring back tone server cannot identify which one thereof is the media response for the customized ring back tone service sent by the calling terminal and which one thereof is the media request for the customized ring tone service sent by the customized ring tone server, and therefore cannot implement correct media negotiation with the calling terminal. By adding an attribute identification in the early session SDP in the embodiments of the present invention, the customized ring back tone server can identify the media response sent by the calling terminal according to the attribute identification in the early session SDP, and the customized ring tone server can identify the media response sent by the called terminal according to the attribute identification in the early session SDP, thereby implementing media negotiation.

S108: the called terminal receives the PRACK request processed by the customized ring tone server and the IMS core network at the called side. The called terminal detects that two content-dispositions simultaneously contained in the received PRACK request are both media requests (CAT early session SDP_A; CRS early session SDP_O) of early session, identifies the media request for the customized ring tone service sent by the customized ring tone server according to the attribute identification in the early session SDP for the customized ring tone service, and performs media negotiation with the customized ring tone server.

S109: when returning the response message to the confirmation message PRACK for the 183 reliable temporary response, the called terminal needs to carry the media response generated by media negotiation with the customized ring tone server.

S110: the response message 200 (CRS early session SDP_A, recvonly) to the confirmation message PRACK for the 183 reliable temporary response containing the media response generated by media negotiation between the called terminal and the customized ring tone server is forwarded to the customized ring tone server, so as to complete media negotiation between the called terminal and the customized ring tone server.

S111: the called terminal sends a 180 response to indicate that it is ready to ring tone. After receiving the 180 response, the customized ring back tone server starts to play customized ring back tone to the calling terminal according to the media negotiation result with the calling terminal. After receiving the 180 response, the customized ring tone server starts to play customized ring tone to the called terminal according to the media negotiation result with the called terminal.

When the called terminal is picked up, the called terminal sends a 200 response to inform that a session will begin at this time. The customized ring back tone server stops playing customized ring back tone after receiving the 200 response. The customized ring tone server stops playing customized ring tone after receiving the 200 response.

After a response confirmation message ACK sent by the calling terminal arrives at the called terminal, session connection is established between the calling and called terminals.

The present invention provides a method for implementing customized ring back tone service and customized ring tone service, and as shown in FIG. 2A-2F, the method comprises the following steps.

S201: the calling terminal sends a calling request, which contains calling terminal identification, called terminal identification, supporting early session capability tag and reliable response capability tag of the calling terminal.

After receiving the calling request sent from the calling terminal, the IMS core network at the calling side checks stored initial filtering rules corresponding to the calling terminal identification, and identifies the application server needed to process the calling request according to the initial filtering rule to which the calling request conforms. When determining that the initial filtering rule requires the customized ring tone server to process the calling request, the IMS core network at the calling side sends the calling request to the customized ring tone server.

After receiving the calling request, the customized ring tone server determines that the calling user subscribes the customized ring tone service according to the calling terminal identification in the calling request, and returns the calling request to the IMS core network at the calling side for continuing sending the calling request.

The IMS core network at the calling side determines the IMS core home core network according to the called terminal identification contained in the calling request, and forwards the calling request to the IMS core network at the called side. After receiving the calling request sent from the IMS core network at the calling side, the IMS core network at the called side checks stored initial filtering rules corresponding to the called terminal identification, and identifies the application server needed to process the calling request according to the initial filtering rule to which the calling request conforms. When determining that the initial filtering rule requires the customized ring back tone server to process the calling request, the IMS core network at the calling side sends the calling request to the customized ring back tone server.

After receiving the calling request, the customized ring back tone server determines that the called user subscribes the customized ring back tone service according to the called terminal identification in the calling request, determines that the calling terminal supports customized ring back tone early media according to the supporting early session capability tag and the reliable response capability tag of the calling terminal contained in a Support header in the calling request, and returns the calling request to the IMS core network at the called side for continuing sending the calling request. The IMS core network at the called side forwards the calling request to the called terminal according to the called terminal identification contained in the calling request and the address asserted by the called terminal during registration.

After receiving the calling request, the called terminal performs normal media negotiation according to a normal media request (session SDP_O) in the calling request, and then returns the response message to the IMS core network at the called side. The IMS core network at the called side forwards the response message to the customized ring back tone server according to a routing path for the calling request carried in the response message. After receiving a reliable temporary response 183 (session SDP_A) returned by the called terminal, the customized ring back tone server inserts in the response early session SDP representative of a customized ring back tone media request, and sets a session level attribute line a=sendonly in the SDP, wherein the attribute line a=sendonly serves as a session level attribute to identify that the media stream corresponding to the SDP flows unidirectionally from the network. The customized ring back tone server sends to the IMS core network at the called side the processed reliable temporary response 183 (session SDP_A; CAT early session SDP_O, sendonly).

In the embodiments of the present invention, the attribute line can be defined as a=sendonly or a=recvonly or a=sendrecv according to the SDP protocol, to represent the direction of transmission of the media stream. Whereas in the customized ring back tone service, all media contained in the customized ring back tone are always unidirectionally transmitted from the network to the calling terminal.

The IMS core network at the called side, the IMS core network at the calling side and the customized ring tone server send to the calling terminal the reliable temporary response 183 (session SDP_A; CAT early session SDP_O, sendonly) according to the routing path for the calling request carried in the response message.

S202: the calling terminal sends to the IMS core network at the calling side a confirmation message PRACK for the 183 reliable temporary response, the message carrying therewith (CAT early session SDP_A, recvonly).

After receiving the 183 response, the calling terminal performs customized ring back tone early media negotiation, wherein the negotiating method may be as follows: the calling terminal judges the media type and coding scheme etc. contained in the customized ring back tone early media request in the 183 response message, and performs matching according to its own capability. The calling terminal sends the confirmation message PRACK for the 183 reliable temporary response, wherein the message includes the response CAT early session SDP_A to the customized ring back tone early media request in the 183 reliable temporary response, and the response includes a session level attribute identification a=recvonly, which serves as a session level attribute for identifying that media streams corresponding to the SDP all flows unidirectionally to the calling terminal.

S203: the IMS core network at the calling side forwards the response message to the customized ring tone server according to a route set carried in the confirmation message PRACK for the 183 reliable temporary response.

S204: the customized ring tone server sends to the IMS core network at the calling side the processed confirmation message PRACK for the 183 reliable temporary response, the message carrying therewith (CAT early session SDP_A, recvonly; CRS early session SDP_O, sendonly).

After receiving the confirmation message PRACK for the reliable temporary response 180 returned by the calling terminal, the customized ring tone server inserts in the message early session SDP representative of a customized ring tone media request, and sets a session level attribute line a=sendonly in the SDP, wherein the attribute line a=sendonly serves as a session level attribute to identify that the media stream corresponding to the SDP flows unidirectionally from the network.

In the embodiments of the present invention, the attribute line can be defined as a=sendonly or a=recvonly or a=sendrecv according to the SDP protocol, to represent the direction of transmission of the media stream. In the customized ring tone service, all the media contained in the customized ring tone are always unidirectionally transmitted from the network to the called terminal.

S205: the IMS core network at the calling side forwards the response message to the IMS core network at the called side according to the route set carried in the confirmation message PRACK for the 183 reliable temporary response.

S206: the IMS core network at the called side forwards the response message to the customized ring back tone server according to the route set carried in the confirmation message PRACK for the 183 reliable temporary response.

S207: the customized ring back tone server detects that the received PRACK request contains two SDPs (CAT early session SDP_A, recvonly; CRS early session SDP_O, sendonly) of early media, and parses directional attributes contained in the two SDPs. If one of the SDPs contains a session level attribute as a=recvonly, the customized ring back tone server determines that the SDP is a response to the customized ring back tone early media request returned by the calling terminal, and thereby completes customized ring back tone early media negotiation with the calling terminal.

After successfully performing customized ring back tone early media negotiation with the calling terminal, the customized ring back tone server removes the response to the customized ring back tone early media request from the PRACK message, and then sends the processed PRACK message to the IMS core network at the called side.

S208: the IMS core network at the called side forwards the response message to the called terminal according to the route set carried in the confirmation message PRACK for the 183 reliable temporary response.

S209: the called terminal returns to the IMS core network at the called side the response message to the confirmation message PRACK for the 183 reliable temporary response, the message carrying therewith (CRS early session SDP_A, recvonly).

After receiving the PRACK message, the called terminal performs customized ring tone early media negotiation, wherein the negotiating method may be as follows: the calling terminal judges the media type and coding scheme etc. contained in the customized ring tone early media request in the PRACK message, and performs matching according to its own capability.

When sending a 200OK response to the PRACK, the called terminal inserts therein a response to the customized ring tone early media request in the PRACK, and the SDP includes a session level attribute line a=recvonly to indicate that media streams corresponding to the SDP all flow unidirectionally to the called terminal.

In the embodiments of the present invention, if a media request containing attribute identification a=sendonly is received, the returned media response thereto must contain attribute identification a=recvonly.

S210: the customized ring back tone server, the IMS core network at the called side, the IMS core network at the calling side and the customized ring tone server forward the response message 200 to the confirmation message PRACK for the 183 reliable temporary response to the calling terminal according to the route set carried in the response message.

After receiving the response message 200 (CRS early session SDP_A, recvonly) to the confirmation message PRACK for the 183 reliable temporary response, the customized ring tone server determines that the SDP included in the message is a response to the customized ring tone early media request returned by the called terminal, so as to complete customized ring tone early media negotiation with the called terminal.

S211: the called terminal sends a 180 response to indicate that it is ready to ring tone. The customized ring back tone server, the IMS core network at the called side, the IMS core network at the calling side and the customized ring tone server forward the 180 response to the calling terminal according to the route set carried in the 180 response message. After receiving the 180 response, the customized ring back tone server starts to play customized ring back tone to the calling terminal. After receiving the 180 response, the customized ring tone server starts to play customized ring tone to the called terminal.

When the called terminal is picked up, the called terminal sends a 200 response, to inform that session will begin at this time. The customized ring back tone server, the IMS core network at the called side, the IMS core network at the calling side and the customized ring tone server forward the 200 response to the calling terminal according to the route set carried in the 200 response message. The customized ring back tone server stops playing customized ring back tone after receiving the 200 response. The customized ring tone server stops playing customized ring tone after receiving the 200 response.

After receiving the 200 response, the calling terminal sends a response confirmation message ACK, which is forwarded to the called terminal through the customized ring tone server, the IMS core network at the calling side, the IMS core network at the called side and the customized ring back tone server. Normal session connection is established between the calling and called terminals.

In this embodiment of the present invention, when receiving the confirmation message PRACK for the 183 reliable temporary response, if the customized ring tone server finds that the message has already contained the SDP of an early session, it can add attribute identification in the SDP when inserting the SDP of the customized ring tone service, wherein the attribute identification may either be such a session level attribute as a=sendonly\s=crs, or such a media level attribute as a=sendonly. When receiving the 183 reliable temporary response returned by the called terminal, the customized ring back tone server can add attribute identification in the SDP when inserting the SDP of the customized ring back tone service, wherein the attribute identification may either be such a session level attribute as a=sendonly\s=cat, or such a media level attribute as a=sendonly. When receiving the 183 reliable temporary response, the calling terminal would make the early media response carrying an attribute corresponding to the early media request in 183, wherein the identification may either be a=recvonly (corresponding to the attribute a=sendonly in the media request) or s=cat (corresponding to the attribute s=cat in the media request). When receiving the confirmation message PRACK for the 183 reliable temporary response and making the early media response, the called terminal would carries an attribute corresponding to the early media request in the PRACK, wherein the identification may either be a=recvonly (corresponding to the attribute a=sendonly in the media request) or s=crs (corresponding to the attribute s=crs in the media request).

In another embodiment of the present invention, if the customized ring back tone service or the customized ring tone service capable of carrying a DTMF signal via RTP is further required to carry the DTMF signal via RTP—for example, such service characteristics as customized ring back tone or customized ring tone duplication, and customized ring back tone or customized ring tone suspension—the flow of the technical solution is similar to that of the above embodiment. This embodiment identifies the SDP through the media level attribute of the RTP stream used for identifying DTMF, and identifies the SDP of the customized ring back tone server service or the customized ring tone server service by adding directional attribute identification in the early media SDP of the early session. When the customized ring tone server generates the SDP and adds identification, if RTP should be used to carry DTMF signal transmission, it is possible to use a single m line in the SDP to describe the information of the DTMF channel, namely to create a separate media channel for DTMF signal transmission, and to add media level attribute identification, such as a=sendonly, for other m lines in the SDP. When receiving a PRACK request that contains two early media SDPs, the customized ring back tone application server identifies by parsing directional attributes contained in the SDP other than the DTMF that other m lines other than the m line used by DTMF each contain an SDP having a media level attribute as a=recvonly and being the SDP answer of the customized ring back tone service returned by the calling terminal. The customized ring back tone server extracts this SDP answer from the PRACK request as the result of media negotiation with the calling terminal, deletes it from the request, and sends the PRACK that only contains another SDP.

In this embodiment, the RTP channel used for DTMF transmission can be described by using a single m line in the SDP. The SDP can be referred to as follows:

a1 m=audio 12344 RTP/AVP 99
a2 a=rtpmap: 99 pcmu/8000
a3 m=audio 12346 RTP/AVP 100 101
a4 a=rtpmap: 101 telephone-event/8000
a5 a=fmtp: 101 0-15 wherein the information in identification lines a3-a5 are RTP channel information description dedicated for DTMF. The rest is RTP channel information description used for audio media.

Figure 3:
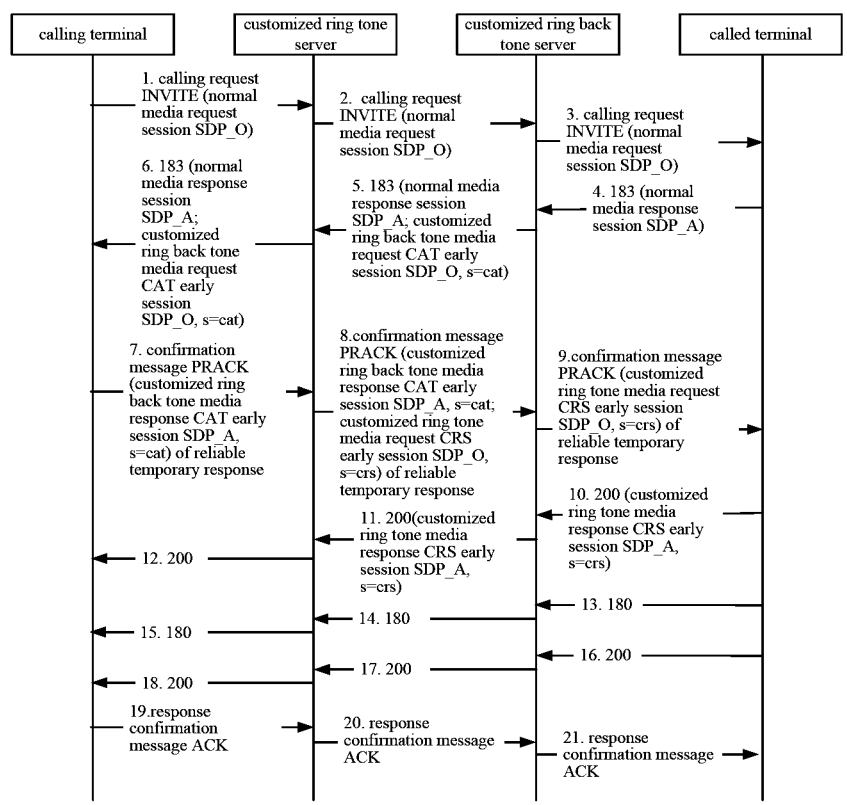
FIG. 3 is a schematic diagram illustrating the calling flow for implementing customized ring back tone service and customized ring tone service provided by the present invention.
Figure 4A:
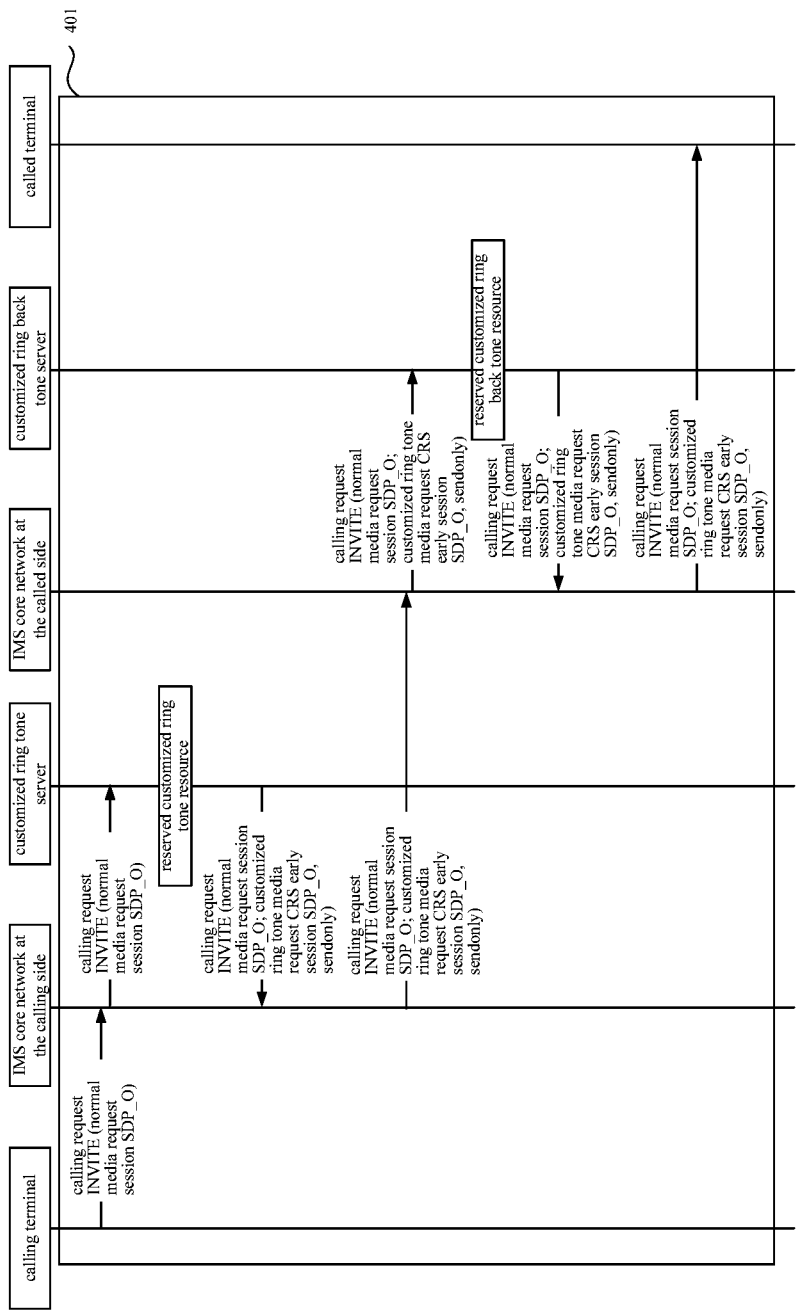
FIGS. 4A-4F illustrate an embodiment of a method for implementing customized ring back tone service and customized ring tone service provided by the present invention.
Figure 4B:
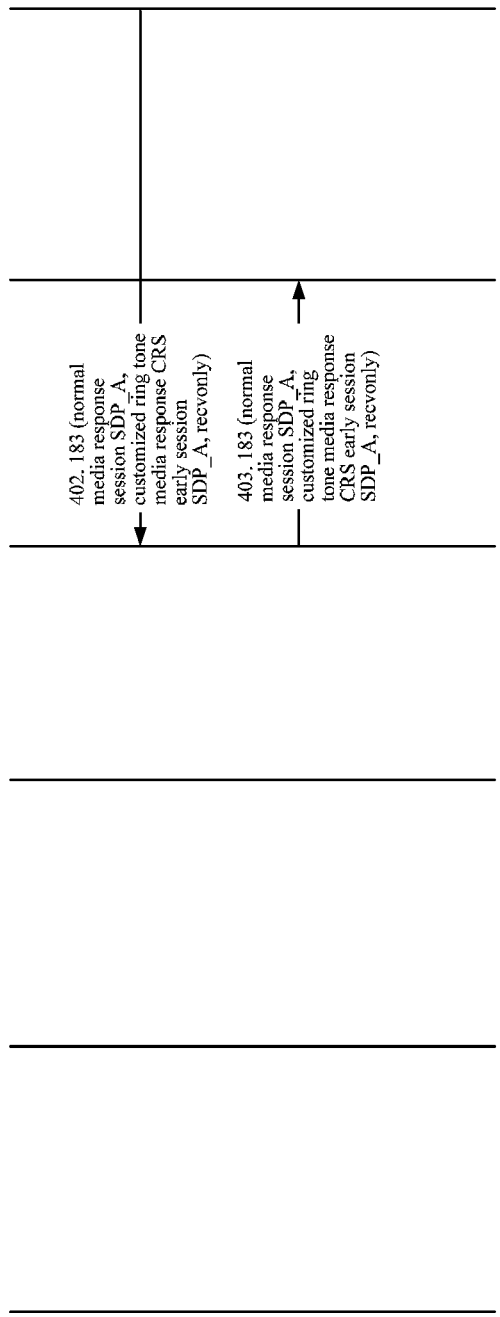
Figure 4C:
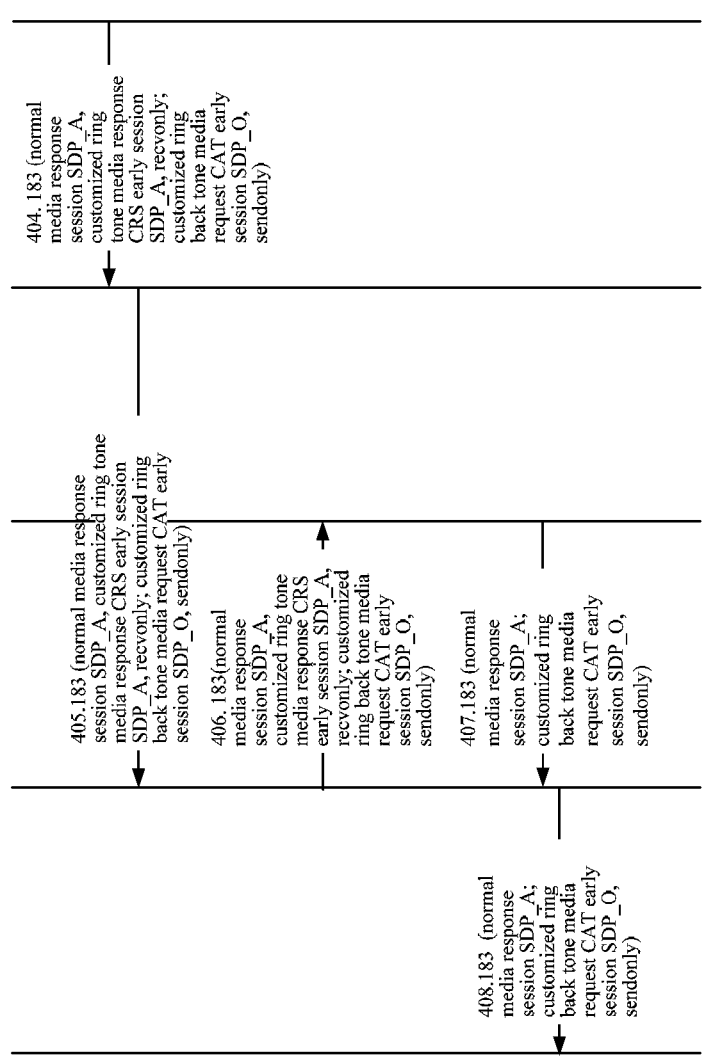
Figure 4D:
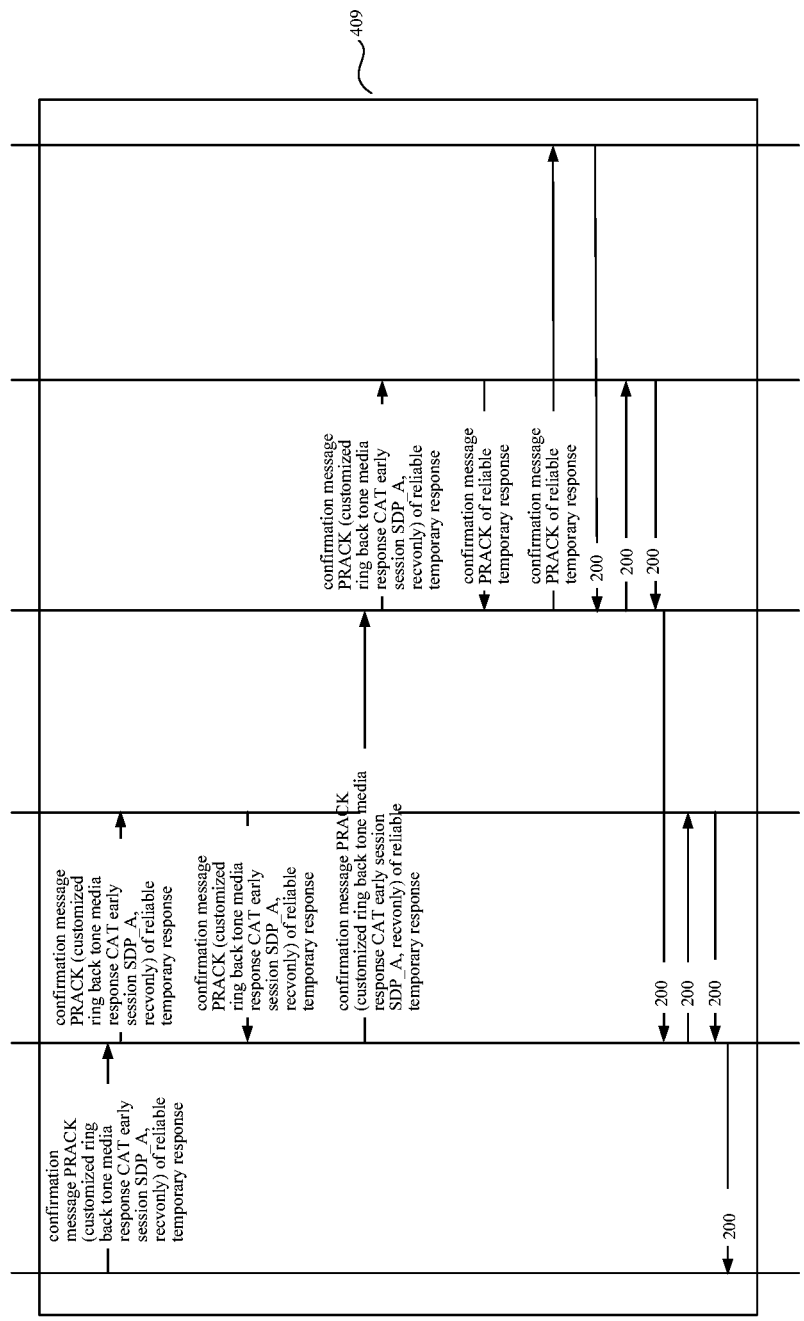
Figure 4E:
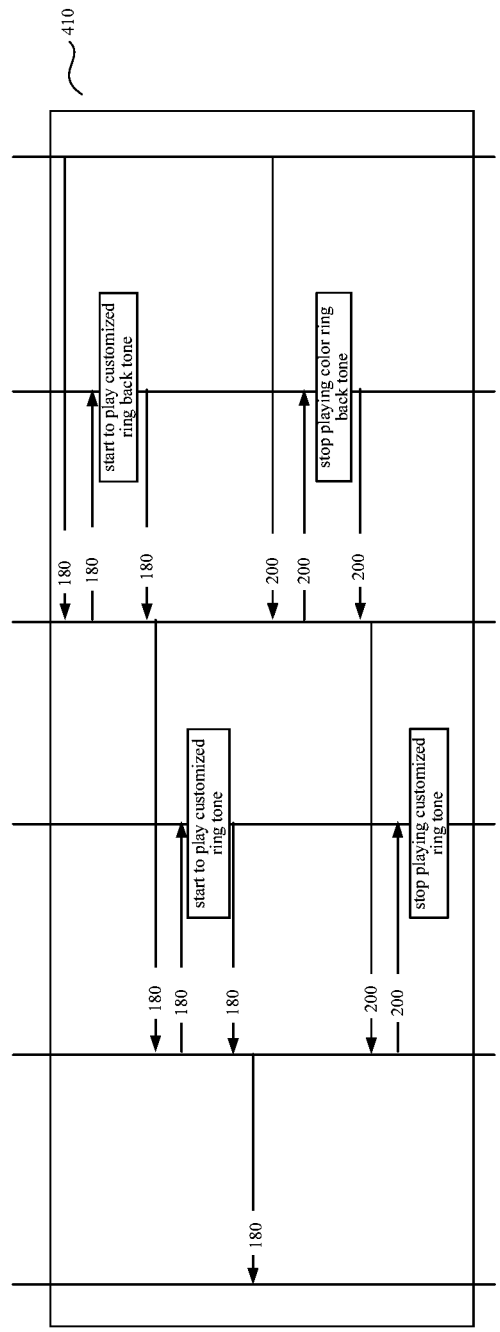
Figure 4F:
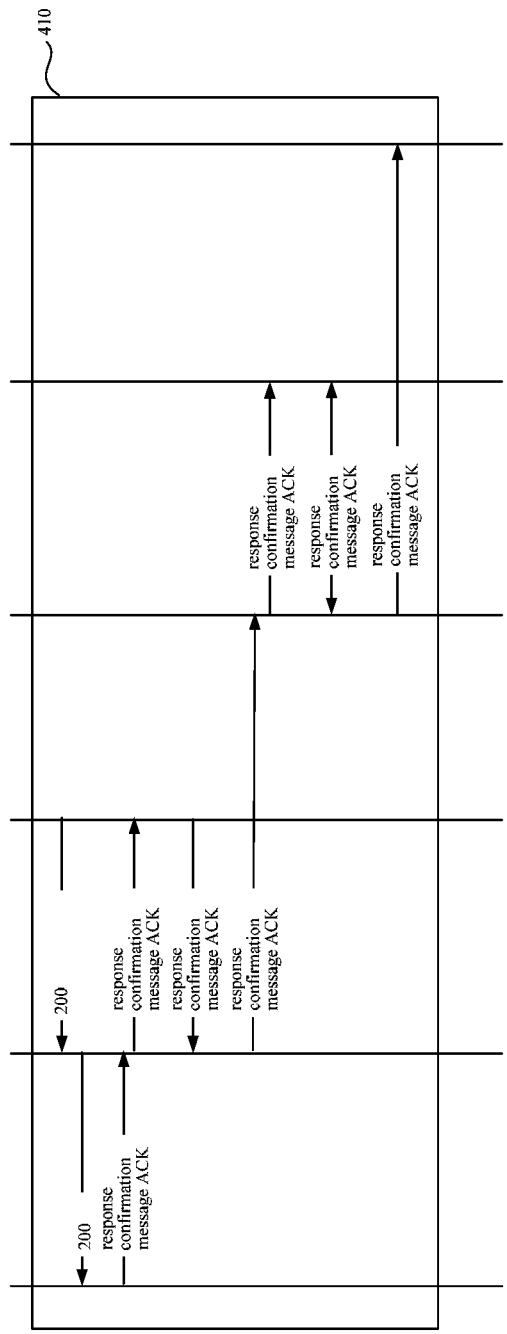

In another embodiment of the present invention, as in the calling flow for implementing customized ring back tone service and customized ring tone service shown in FIG. 3, SDPs in this embodiment are used as a criterion for differentiating from different SDPs with the session level attribute "s=". For instance, SDP of the customized ring back tone service uses s=cat, while SDP of the customized ring tone service uses s=crs.

S301: the calling terminal sends a calling request, which contains calling terminal identification, called terminal identification, supporting early session capability tag and reliable response capability tag of the calling terminal.

S302: after receiving the calling request, the customized ring tone server determines that the calling user subscribes the customized ring tone service according to the calling terminal identification in the calling request, and returns the calling request to the IMS core network at the calling side for continuing sending.

S303: after receiving the calling request, the customized ring back tone server determines that the called user subscribes the customized ring back tone service according to the called terminal identification in the calling request, determines that the calling terminal supports customized ring back tone early media according to the supporting early session capability tag and the reliable response capability tag of the calling terminal contained in a Support header in the calling request, and returns the calling request to the IMS core network at the called side for continuing sending. The IMS core network at the called side forwards the calling request to the called terminal according to the called terminal identification contained in the calling request and the address asserted by the called terminal during registration.

S304: after receiving the calling request, the called terminal performs normal media negotiation according to a normal session media request (session SDP_O) in the calling request, judges the media type and coding scheme etc. contained in the normal session media request, performs matching according to its own capability, generates a media response, and returns the media response carried in the response message to the IMS core network of the called side.

S305: when receiving a 183 reliable temporary response returned by the called terminal, the customized ring back tone server inserts in the response an early session SDP of the customized ring back tone service, and sets an attribute line s=cat in the SDP. In this embodiment, the attribute identification is the attribute line s for indicating that media streams corresponding to the SDP are all used for the customized ring back tone service. The customized ring back tone server sends to the customized ring tone server the processed 180 reliable temporary response. The customized ring back tone server sends to the IMS core network at the called side the processed reliable temporary response 183 (session SDP_A; CAT early session SDP_O, s=cat).

In the embodiments of the present invention, the attribute line can be defined as s=cat or s=crs according to the SDP protocol to represent the service to which media streams pertain.

S306: the customized ring tone server sends the reliable temporary response 183 (session SDP_A; CAT early session SDP_O, s=cat) to the calling terminal according to a routing path for the calling request carried in the response message.

S307: the calling terminal sends to the IMS core network at the calling side a confirmation message PRACK for the 183 reliable temporary response, the message carrying therewith a response (CAT early session SDP_A, s=cat) to a customized ring back tone early media request.

After receiving the 183 response, the calling terminal performs customized ring back tone early media negotiation, wherein the negotiating method may be as follows: the calling terminal judges the media type and coding scheme etc. contained in the customized ring back tone early media request in the 183 response message, and performing matching according to its own capability. The calling terminal sends a confirmation message PRACK for the 183 reliable temporary response, wherein the message includes the response CAT early session SDP_A to the customized ring back tone early media request in the 183 reliable temporary response, and includes in the response a session name attribute identification s=cat, which serves as a session level attribute for identifying that media streams corresponding to the SDP are all used for the customized ring back tone service.

In the embodiments of the present invention, if a media request containing attribute identification s=crs is received, the media response thereto must contain attribute identification s=crs.

S308: the customized ring tone server sends to the IMS core network at the calling side the processed confirmation message PRACK for the 183 reliable temporary response, the message carrying therewith (CAT early session SDP_A, s=cat; CRS early session SDP_O, s=crs).

After receiving the confirmation message PRACK for the reliable temporary response 183 returned by the calling terminal, the customized ring tone server inserts in the message early session SDP representative of a customized ring tone media request, and sets a session name attribute line s=crs in the SDP, wherein the attribute line s=crs serves as a session level attribute to identify that media streams corresponding to the SDP are all used for the customized ring tone service.

In the embodiments of the present invention, the attribute line can be defined as s=cat or s=crs according to the SDP protocol, to represent the service to which media streams pertain.

S309: the customized ring back tone server detects that the received PRACK request contains two SDPs (CAT early session SDP_A, s=cat; CRS early session SDP_O, s=crs) of early media, and parses session name attributes contained in the two SDPs. If one of the SDPs contains a session name attribute as s=cat, the customized ring back tone server determines that the SDP is a response to the customized ring back tone early media request returned by the calling terminal, and thereby completes customized ring back tone early media negotiation with the calling terminal.

After successfully performing customized ring back tone early media negotiation with the calling terminal, the customized ring back tone server removes the response to the customized ring back tone early media request from the PRACK message, and then sends the processed PRACK message to the IMS core network at the called side.

S310: the called terminal returns to the IMS core network at the called side the response message to the confirmation message PRACK for the 183 reliable temporary response, the message carrying therewith (CRS early session SDP_A, s=crs).

After receiving the PRACK message, the called terminal performs customized ring tone early media negotiation, wherein the negotiating method may be as follows: the calling terminal judges the media type and coding scheme etc. contained in the customized ring tone early media request in the PRACK message, and performs matching according to its own capability. While sending a 200OK response to the PRACK, the called terminal inserts therein a response to the customized ring tone early media request in the PRACK, and includes in the SDP a session name attribute line s=crs, indicating that media streams corresponding to the SDP are all used for the customized ring tone service.

In the embodiments of the present invention, if a media request containing attribute identification s=crs is received, the media response thereto must contain attribute identification s=crs.

S311: the customized ring back tone server forwards the received response message to the confirmation message PRACK for the 183 reliable temporary response to the customized ring tone server.

S312: After receiving the response message 200 (CRS early session SDP_A, s=crs) to the confirmation message PRACK for the 183 reliable temporary response, the customized ring tone server detects that the SDP included in the 200 response message contains the session name attribute line s=crs, and determines that the SDP is a response to the customized ring tone early media request returned by the called terminal, so as to complete the customized ring tone early media negotiation with the called terminal.

After successfully performing the customized ring tone early media negotiation with the called terminal, the customized ring tone server removes the response to the customized ring tone early media request from the 200 message, and then sends the processed 200 message to the calling terminal.

S313-S315: the called terminal sends a 180 response to indicates that it is ready to ring tone. The 180 response is forwarded to the calling terminal after passing through the customized ring back tone server and the customized ring tone server. After receiving the 180 response, the customized ring back tone server starts to play customized ring back tone to the calling terminal. After receiving the 180 response, the customized ring tone server starts to play customized ring tone to the called terminal.

S316-S318: when the called terminal is picked up, the called terminal sends a 200 response to inform that session will begin at this time. The customized ring back tone server and the customized ring tone server forward the 200 response to the calling terminal. The customized ring back tone server stops playing customized ring back tone after receiving the 200 response. The customized ring tone server stops playing customized ring tone after receiving the 200 response.

S319-S321: after receiving the 200 response, the calling terminal sends a response confirmation message ACK, which is forwarded to the called terminal through the customized ring tone server and the customized ring back tone server. Normal session connection is established between the calling and called terminals.

The present invention provides an embodiment of a method for implementing customized ring back tone service and customized ring tone service, which comprises the following steps, as shown in FIG. 4A-4F.

S401: the calling terminal sends a calling request, which contains calling terminal identification, called terminal identification, supporting early session capability tag and reliable response capability tag of the calling terminal.

After receiving the calling request sent from the calling terminal, the IMS core network at the calling side checks stored initial filtering rules that correspond to the calling terminal identification, and identifies the application server needed to process the calling request according to the initial filtering rule to which the calling request conforms. When judging that the initial filtering rule requires the customized ring tone server to process the calling request, the IMS core network at the calling side sends the calling request to the customized ring tone server.

After receiving the calling request, the customized ring tone server determines that the calling user subscribes the customized ring tone service according to the calling terminal identification in the calling request, and sends to the IMS core network at the calling side the processed calling request INVITE, which carries therewith (session SDP_O; CRS early session SDP_O, sendonly).

After receiving the calling request, the customized ring tone server determines that the calling user subscribes the customized ring tone service according to the calling terminal identification in the calling request, inserts in the message early session SDP representative of a customized ring tone media request, and sets a session level attribute line a=sendonly in the SDP, wherein the attribute line a=sendonly serves as a session level attribute to identify that the media stream corresponding to the SDP flows unidirectionally from the network.

In the embodiments of the present invention, the attribute line can be defined as a=sendonly or a=recvonly or a=sendrecv according to the SDP protocol, to represent the direction of transmission of the media stream. In the customized ring tone service, all media contained in the customized ring tone are always unidirectionally transmitted from the network to the called terminal.

The IMS core network at the calling side determines the IMS core home core network according to the called terminal identification contained in the calling request, and forwards the calling request to the IMS core network at the called side. After receiving the calling request sent from the IMS core network at the calling side, the IMS core network at the called side checks stored initial filtering rules that correspond to the called terminal identification, and identifies the application server needed to process the calling request according to the initial filtering rule to which the calling request conforms. When judging that the initial filtering rule requires the customized ring back tone server to process the calling request, the IMS core network at the calling side sends the calling request to the customized ring back tone server.

After receiving the calling request, the customized ring back tone server determines that the called user subscribes the customized ring back tone service according to the called terminal identification in the calling request, determines that the calling terminal supports customized ring back tone early media according to the supporting early session capability tag and the reliable response capability tag of the calling terminal contained in a Support header in the calling request, and returns the calling request to the IMS core network at the called side for continuing sending. The IMS core network at the called side forwards the calling request to the called terminal according to the called terminal identification contained in the calling request and the address asserted by the called terminal during registration.

S402: after receiving the calling request, the called terminal performs media negotiation according to a normal media request (session SDP_O) and an early media request (CRS early session SDP_O, sendonly) of the customized ring tone service in the calling request, respectively, and returns the response message 183 (session SDP_A; CRS early session SDP_A, recvonly) to the IMS core network at the called side.

After receiving the INVITE calling request, the calling terminal performs customized ring tone early media negotiation, wherein the negotiating method may be as follows: the called terminal judges the media type and coding scheme etc. contained in the customized ring tone early media request in the INVITE calling request, and performs matching according to its own capability. The called terminal sends the 183 reliable temporary response to the INVITE calling request, wherein the message includes the response CRS early session SDP_A to the customized ring tone early media request in the INVITE calling request, and the response includes a session level attribute identification a=recvonly, which serves as a session level attribute for identifying that media streams corresponding to the SDP all flow unidirectionally to the called terminal.

S403: the IMS core network at the called side forwards the response message to the customized ring back tone server according to a routing path for the calling request carried in the response message.

S404: after receiving the reliable temporary response 183 (session SDP_A; CRS early session SDP_A, recvonly) returned by the called terminal, the customized ring back tone server inserts in the response early session SDP representative of a customized ring back tone media request, and sets a session level attribute line a=sendonly in the SDP, wherein the attribute line a=sendonly serves as a session level attribute to identify that the media stream corresponding to the SDP flows unidirectionally from the network. The customized ring back tone server sends to the IMS core network at the called side the processed reliable temporary response 183 (session SDP_A; CRS early session SDP_A, recvonly; CAT early session SDP_O, sendonly).

In the embodiments of the present invention, the attribute line can be defined as a=sendonly or a=recvonly or a=sendrecv according to the SDP protocol, to represent the direction of transmission of the media stream. Whereas in the customized ring back tone service, all media contained in the customized ring back tone are always unidirectionally transmitted from the network to the calling terminal.

S405: the IMS core network at the called side forwards the response message to the IMS core network at the calling side according to a route set carried in the 183 reliable temporary response.

S406: the IMS core network at the calling side forwards the response message to the customized ring tone server according to the route set carried in the 183 reliable temporary response.

S407: the customized ring tone server detects that the received 183 reliable temporary response contains two SDPs (CRS early session SDP_A, recvonly; CAT early session SDP_O, sendonly) of early media, and parses directional attributes contained in the two SDPs. If one of the SDPs contains a session level attribute as a=recvonly, the customized ring tone server determines that the SDP is a response to the customized ring tone early media request returned by the called terminal, and thereby completes customized ring tone early media negotiation with the called terminal.

After successfully performing customized ring tone early media negotiation with the called terminal, the customized ring tone server removes the response to the customized ring tone early media request from the 183 reliable temporary response, and then sends the processed reliable temporary response message 183 (session SDP_A; CAT early session SDP_O, sendonly) to the IMS core network at the called side.

S408: the IMS core network at the calling side forwards the response message to the calling terminal according to the route set carried in the 183 reliable temporary response.

S409: the calling terminal sends to the IMS core network at the calling side the confirmation message PRACK for the 183 reliable temporary response, the message carrying therewith (CAT early session SDP_A, recvonly).

After receiving the 183 response, the calling terminal performs customized ring back tone early media negotiation, wherein the negotiating method may be as follows: the calling terminal judges the media type and coding scheme etc. contained in the customized ring back tone early media request in the 183 response message, and performs matching according to its own capability. The calling terminal sends the confirmation message PRACK for the 183 reliable temporary response, wherein the message includes the response CAT early session SDP_A to the customized ring back tone early media request in the 183 reliable temporary response, and the response includes a session level attribute identification a=recvonly, which serves as a session level attribute for identifying that media streams corresponding to the SDP all flow unidirectionally to the calling terminal.

The IMS core network at the calling side, the customized ring tone server and the IMS core network at the calling side forward the response message to the customized ring back tone server according to the route set carried in the confirmation message PRACK of the 183 reliable temporary response.

The customized ring back tone server detects that the received PRACK request contains an SDP (CAT early session SDP_A, recvonly) of an early media, then extracts the SDP as a response to the customized ring back tone early media request returned by the calling terminal, and thereby completes the customized ring back tone early media negotiation with the calling terminal.

After successfully performing customized ring back tone early media negotiation with the calling terminal, the customized ring back tone server removes the response to the customized ring back tone early media request from the PRACK message, and then sends the processed PRACK message to the IMS core network at the called side.

The IMS core network at the called side forwards the response message to the called terminal according to the route set carried in the confirmation message PRACK of the 183 reliable temporary response.

The called terminal returns the response message to the confirmation message PRACK for the 183 reliable temporary response to the IMS core network at the called side.

The customized ring back tone server, the IMS core network at the called side, the IMS core network at the calling side and the customized ring tone server forward the response message 200 to the confirmation message PRACK for the 183 reliable temporary response to the calling terminal according to the route set carried in the response message.

S410: the called terminal sends a 180 response to indicate that it is ready to ring tone. The customized ring back tone server, the IMS core network at the called side, the IMS core network at the calling side and the customized ring tone server forward the 180 response to the calling terminal according to the route set carried in the 180 response message. After receiving the 180 response, the customized ring back tone server starts to play customized ring back tone to the calling terminal. After receiving the 180 response, the customized ring tone server starts to play customized ring tone to the called terminal.

When the called terminal is picked up, the called terminal sends a 200 response to inform that session will begin at this time. The customized ring back tone server, the IMS core network at the called side, the IMS core network at the calling side and the customized ring tone server forward the 200 response to the calling terminal according to the route set carried in the 200 response message. The customized ring back tone server stops playing customized ring back tone after receiving the 200 response. The customized ring tone server stops playing customized ring tone after receiving the 200 response.

After receiving the 200 response, the calling terminal sends a response confirmation message ACK, which is forwarded to the called terminal by the customized ring tone server, the IMS core network at the calling side, the IMS core network at the called side and the customized ring back tone server. Normal session connection is established between the calling and called terminals.

In this embodiment of the present invention, during the INVITE calling request, the customized ring tone server adds attribute identification in the SDP when inserting the SDP of the customized ring tone service. The attribute identification may either be such a session level attribute as a=sendonly\s=crs, or such a media level attribute as a=sendonly. When receiving the 183 reliable temporary response returned by the called terminal, the customized ring back tone server can add attribute identification in the SDP when inserting the SDP of the customized ring back tone service. The attribute identification may either be such a session level attribute as a=sendonly\s=cat, or such a media level attribute as a=sendonly. When receiving the 183 reliable temporary response to make the early media response, the calling terminal carries an attribute corresponding to the early media request in 183. The identification may either be a=recvonly (corresponding to the attribute a=sendonly in the media request) or s=cat (corresponding to the attribute s=cat in the media request). When receiving the INVITE calling request to make the early media response, the called terminal carries an attribute corresponding to the early media request in the INVITE. The identification may either be a=recvonly (corresponding to the attribute a=sendonly in the media request) or s=crs (corresponding to the attribute s=crs in the media request).

In a embodiment of a method for implementing customized ring back tone service and customized ring tone service according to the present invention, as shown in FIG. 5, the calling terminal subscribes the customized ring back tone service and the customized ring tone service, or the called terminal subscribes the customized ring back tone service or the customized ring tone service; when the calling terminal calls the called terminal, the service is first triggered to the customized ring tone server. The customized ring back tone server may be a first server, and the customized ring tone server may be a second server in this embodiment. The calling flow of this embodiment of the method for implementing customized ring back tone service and customized ring tone service is as follows.

S501: the calling terminal initiates a calling request to the called terminal, and the called terminal returns a media request response message to the first server according to the calling request.

The calling request may include called terminal identification, supporting early session capability tag and reliable response capability tag of the calling terminal. The media request response message may include called terminal identification, capability tag for the called terminal to support early session, and reliable response capability tag.

S502: The first server sends a first reliable response message to the second server according to the media request response message returned by the called terminal, wherein the first reliable response message carries therewith a first early media request.

In this embodiment, the first early media request may include a first attribute identification for identifying the first early media request for media negotiation between the first server and the calling terminal.

In the embodiments of the present invention, the first attribute identification may be an attribute line for representing the direction of transmission of media streams, and the attribute line may either be a session level attribute or a media level attribute. The first attribute identification may also be an attribute line for representing service types.

S503: the second server sends the first reliable response message to the calling terminal, receives a confirmation message returned by the calling terminal, and sends a second confirmation message to the first server according to the confirmation message, wherein the second confirmation message carries therewith a first early media SDP and a second early media SDP.

After receiving the first reliable response message, the calling terminal performs media negotiation with the first server. If the negotiation is successful, the calling terminal includes the first early media response in the confirmation message and returns the confirmation message.

After receiving the confirmation message returned by the calling terminal, the second server finds that the confirmation message has already contained early media description information, i.e. the content-disposition field is "early session", and then adds a second attribute identification in a second early media request while adding the second early media request in the confirmation message, so as to differentiate from the first early media response. The second attribute identification is used for identifying the second early media request for media negotiation between the second server and the called terminal. The second server adds the second early media request in the confirmation message to generate the second confirmation message.

In this embodiment, the second attribute identification may either be such a session level attribute as a=sendonly or s=crs, or such a media level attribute as a=sendonly.

S504: the first server completes early media negotiation with the calling terminal according to the first early media response, and the second server completes early media negotiation with the called terminal according to a second early media response.

The second server identifies according to the second attribute identification that the corresponding early media SDP is the second early media SDP, and then completes early media negotiation with the called terminal according to the information of the second early media SDP. The first server completes early media negotiation with the calling terminal according to another early media SDP, namely the information of the first early media SDP. If the first early media SDP includes a first attribute identification, the first server identifies according to the first attribute identification that the corresponding early media SDP is the first early media SDP, and then completes early media negotiation with the calling terminal according to the information of the first early media SDP.

Figure 5A:
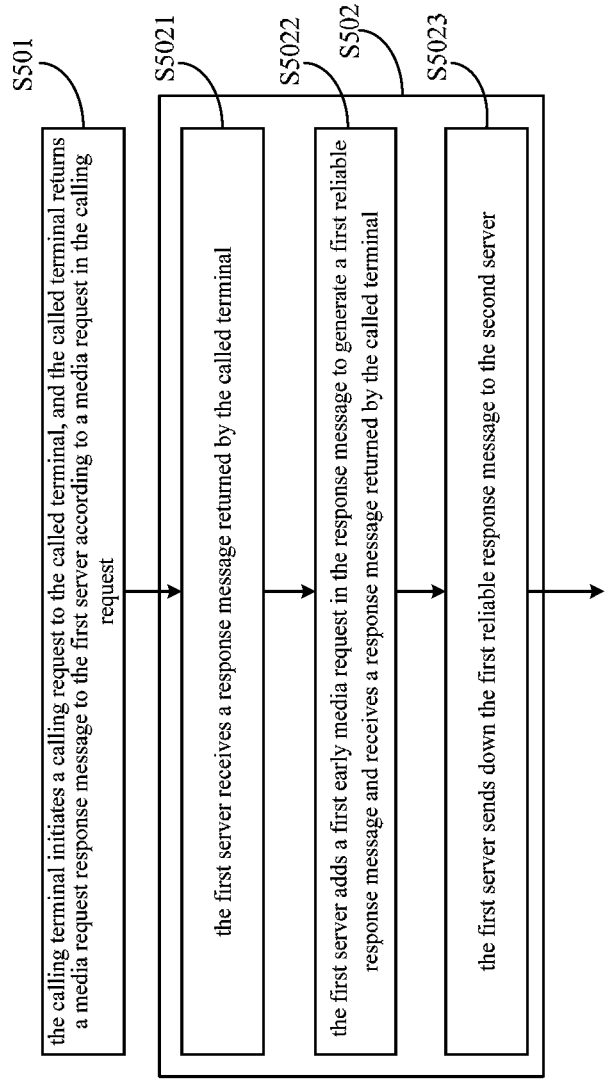
FIG. 5A-5B illustrates another embodiment of a method for implementing customized ring back tone service and customized ring tone service provided by the present invention.
Figure 5B:
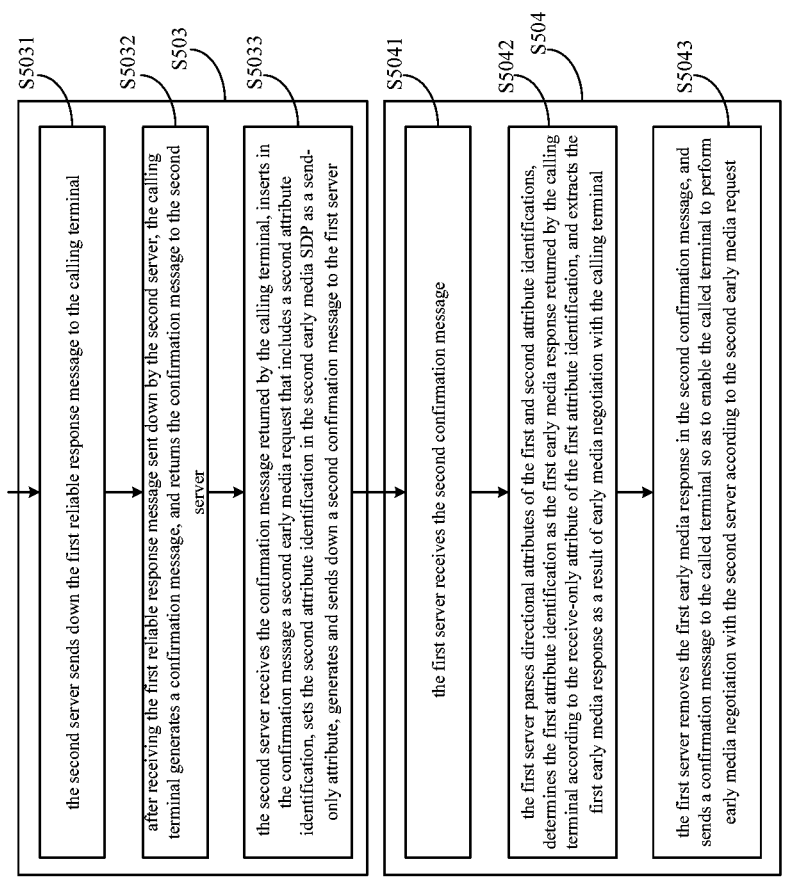

In another embodiment of the present invention, the first attribute identification in the previous embodiment is an attribute line used for representing the direction of transmission of media streams, and the first attribute identification may be either a send-only attribute or a receive-only attribute. As shown in FIG. 5A-5B, Step S502 in the previous embodiment may specifically include the following steps.

S5021: the first server receives a response message returned by the called terminal.

S5022: the first server adds a first early media request in the response message to generate a first reliable response message.

The first early media request may include a first attribute identification, which may be set as a send-only attribute.

S5023: the first server sends the first reliable response message to the second server.

Further, Step S403 may specifically include the following steps.

S5031: the second server sends the first reliable response message to the calling terminal.

S5032: after receiving the first reliable response message sent down by the second server, the calling terminal generates a confirmation message, and returns the confirmation message to the second server.

The calling terminal performs media negotiation with the first server according to the first early media request in the first reliable response message, generates a first early media response that includes the first attribute identification, and generates a confirmation message that includes the first early media response.

In the embodiments of the present invention, the first attribute identifications in the first media request and the first media response may either be identical with or different from each other. For instance, the first attribute identification in the first media request may be a send-only attribute, while the first attribute identification in the first media response may be a receive-only attribute.

S5033: the second server receives the confirmation message returned by the calling terminal, inserts in the confirmation message a second early media request that includes a second attribute identification, sets the second attribute identification in the second early media SDP as a send-only attribute, generates and sends a second confirmation message to the first server.

Moreover, Step 5404 may include the following steps.

S5041: the first server receives the second confirmation message.

S5042: the first server parses directional attributes of the first and second attribute identifications, determines the first attribute identification as the first early media response returned by the calling terminal according to the receive-only attribute of the first attribute identification, and extracts the first early media response as a result of early media negotiation with the calling terminal.

S5043: the first server removes the first early media response in the second confirmation message, and sends a confirmation message to the called terminal to enable the called terminal to perform early media negotiation with the second server according to the second early media request.

Figure 6:
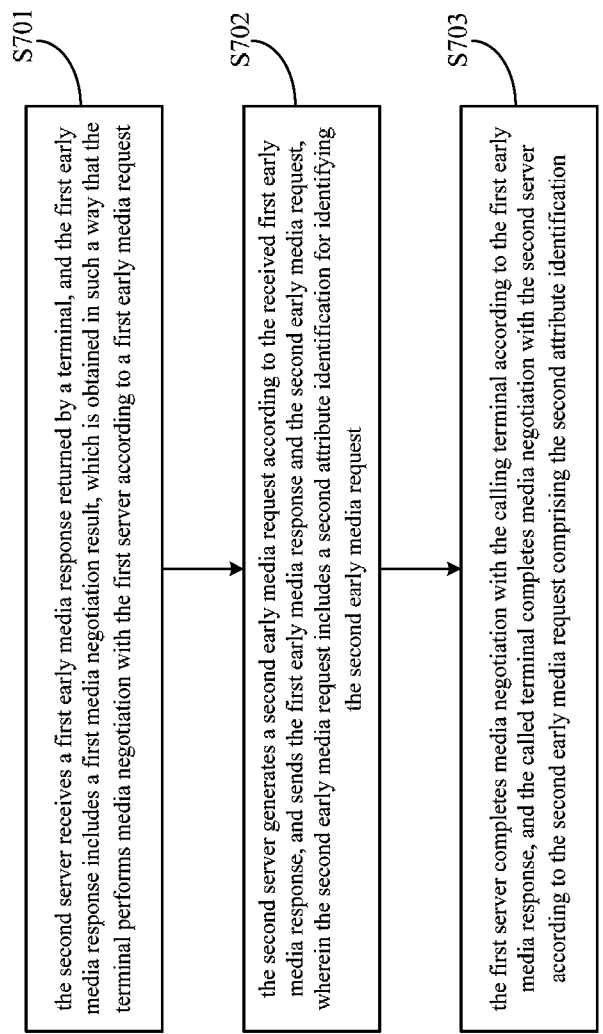
FIG. 6 illustrates an embodiment of a method for implementing customized ring back tone service and customized ring tone service provided by the present invention.

As shown in FIG. 6, the present invention provides an embodiment of a method for implementing customized ring back tone service and customized ring tone service, wherein the method comprises the following steps.

S701: the second server receives a first early media response returned by a terminal, and the first early media response includes a first media negotiation result, which is obtained by the terminal performing media negotiation with the first server according to a first early media request.

S702: the second server generates a second early media request according to the received first early media response, and sends the first early media response and the second early media request, wherein the second early media request includes a second attribute identification for identifying the second early media request.

S703: the first server completes media negotiation with the calling terminal according to the first early media response, and the called terminal completes media negotiation with the second server according to the second early media request comprising the second attribute identification.

The first mode whereby the first server completes early media negotiation with the calling terminal according to the first early media response may be that the first server parses the received first early media response and second early media request, identifies that the first early media response does not include the second attribute identification, and completes early media negotiation with the calling terminal according to the first early media response.

The second mode whereby the first server completes early media negotiation with the calling terminal according to the first early media response may be that the first server parses the received first early media response and second early media request, identifies that the first early media response includes the first attribute identification, and completes early media negotiation with the calling terminal according to the first early media response.

In the embodiments of the present invention, the first early media request or the first early media response may include the first attribute identification for identifying the first early media request or the first early media response.

In the embodiments of the present invention, the first early media request may be carried in a first reliable response message, the first early media response may be carried in a confirmation message, and the second early media request may be carried in a second confirmation message. When the calling terminal initiates a calling request to the called terminal, the first server sends the first reliable response message to the second server according to the media request response message returned by the called terminal, the first reliable response message carrying therewith the first early media request; the second server sends the first reliable response message to the calling terminal, and the calling terminal performs media negotiation with the first server according to the first early media request in the first reliable response message and returns the confirmation message to the second server, wherein the confirmation message includes the first early media response, which is a result of media negotiation between the calling terminal and the first server; the second server receives the confirmation message returned by the calling terminal, and sends the second confirmation message to the first server according to the confirmation message, wherein the second confirmation message includes the first early media response and the second early media request, and the second early media request includes a second attribute identification for identifying the second early media request for media negotiation between the second server and the called terminal; the first server completes early media negotiation with the calling terminal according to the first early media response, and the called terminal completes early media negotiation with the second server according to the second early media request of the second attribute identification.

Figure 7:
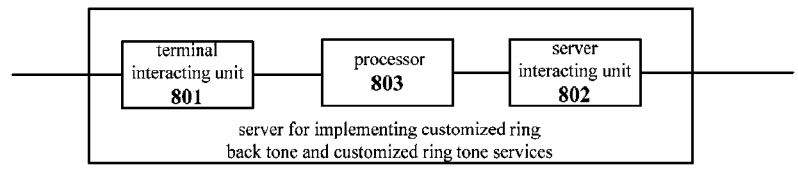
FIG. 7 illustrates an embodiment of a server for implementing customized ring back tone service and customized ring tone service further provided by the present invention.

The present invention further provides an embodiment of a server for implementing customized ring back tone service and customized ring tone service. As shown in FIG. 7, the server comprises a terminal interacting unit 801, for performing message interaction with a terminal; a server interacting unit 802, for performing message interaction with a server; and a processor 803, for instructing the server interacting unit 802 to send a first early media request for performing media negotiation with the terminal, parsing a first early media response to the first early media request according to the first early media response and a second early media request received by the server interacting unit 802, and completing media negotiation according to the first early media response, wherein the second early media request comprises a second attribute identification for identifying the second early media request.

Figure 8:
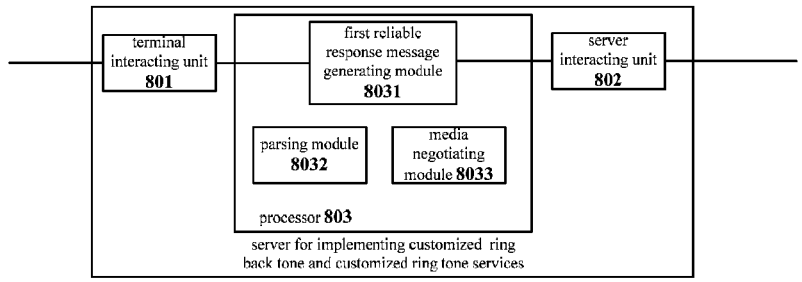
FIG. 8 illustrates an embodiment of a server for implementing customized ring back tone service and customized ring tone service further provided by the present invention.

In another embodiment of the present invention, as shown in FIG. 8, the processor 803 may include a first reliable response message generating module 8031, a parsing module 8032, and a media negotiating module 8033. The first reliable response message generating module 8031 is used for adding the first early media request in a message sent by a receiving terminal, and adding a first attribute identification in the first early media request to generate a first reliable response message; the parsing module 8032 is used for parsing the first early media response for performing media negotiation in a confirmation message according to the first attribute identification; and the media negotiating module 8033 is used for completing media negotiation with the terminal according to the first early media response.

Figure 9:
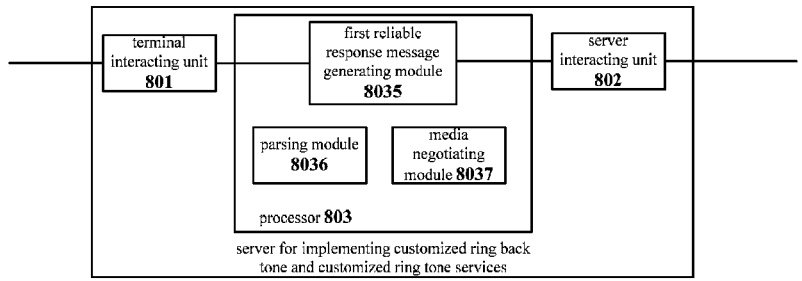
FIG. 9 illustrates an embodiment of a server for implementing customized ring back tone service and customized ring tone service further provided by the present invention.

In another embodiment of the present invention, as shown in FIG. 9, the processor 803 may include a first reliable response message generating module 8035, a parsing module 8036, and a media negotiating module 8037. The first reliable response message generating module 8035 is used for adding the first early media request in a message sent by a receiving terminal to generate a first reliable response message; the parsing module 8036 is used for parsing the first early media response for performing media negotiation in a confirmation message according to the second attribute identification in the second early media request in the confirmation message; and the media negotiating module 8037 is used for completing media negotiation with the terminal according to the first early media response.

Figure 10:
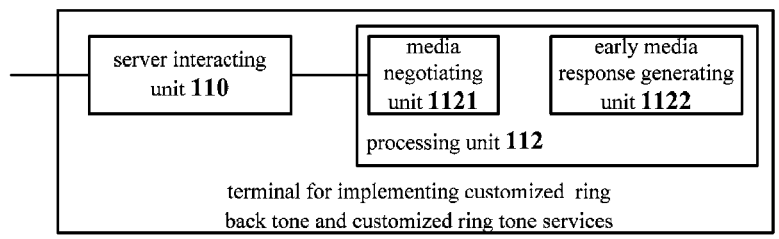
FIG. 10 illustrates an embodiment of a terminal for implementing customized ring back tone service and customized ring tone service provided by the present invention.

Embodiments of the present invention further provide a terminal for implementing customized ring back tone service and customized ring tone service. As shown in FIG. 10, the terminal comprises a server interacting unit 110, for performing message interaction with a server; and a processing unit 112, for performing media negotiation according to an early media request received by the server interacting unit from a server to obtain a media negotiation result, sending an early media response via the server interacting unit, and completing media negotiation, wherein the early media response comprises the media negotiation result.

In another embodiment of the present invention, as shown in FIG. 10, the processing unit 112 may include a media negotiating unit 1121, for performing media negotiation according to an early media request received by the server interacting unit from a server to obtain a media negotiation result; and an early media response generating unit 1122, for generating the early media response according to an attribute identification in the early media request, wherein the first early media response comprises the media negotiation result, and the first early media response is used for completing media negotiation.

Figure 11:
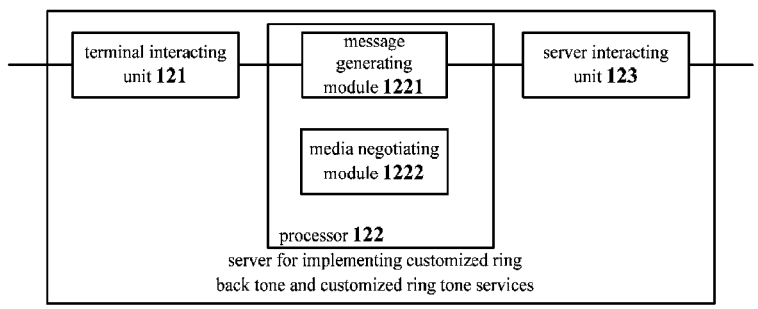
FIG. 11 illustrates an embodiment of a server for implementing customized ring back tone service and customized ring tone service provided by the present invention.

The present invention further provides a server for implementing customized ring back tone service and customized ring tone service. As shown in FIG. 11, the server comprises a terminal interacting unit 121, for performing message interaction with a terminal; a server interacting unit 123, for performing message interaction with a server; and a processor 122, for generating a second early media request when the terminal interacting unit receives a first early media response sent by the terminal, sending the first early media response and the second early media request via the server interacting unit, and completing media negotiation, wherein the second early media request comprises a second attribute identification for identifying the second early media request.

In another embodiment of the present invention, as shown in FIG. 11, the processor 122 may include a message generating module 1221 and a media negotiating module 1222. The message generating module 1221 is used for generating a message according to the first early media response sent by the terminal, wherein the message comprises the first early media response and the second early media request, and the second early media request comprises a second attribute identification for identifying the second early media request; and the media negotiating module 1222 is used for performing media negotiation with the terminal.

The present invention further provides an embodiment of a server for implementing customized ring back tone service and customized ring tone service. The server comprises a terminal interacting unit 131 and a processor 132. The terminal interacting unit is used for performing message interaction with a terminal; and the processor is used for generating an early media request, sending a first early media request to the terminal, and enabling the terminal to perform media negotiation with a server, wherein the first early media request comprises a first attribute identification for identifying the first early media request.

The present invention further provides an embodiment of a method for implementing customized ring back tone service and customized ring tone service. The method comprises: a first server receiving a request, generating an early media request according to the request, sending a first early media request to a terminal, and enabling the terminal to perform media negotiation with a server, wherein the first early media request comprises a first attribute identification for identifying the first early media request.

Figure 12:
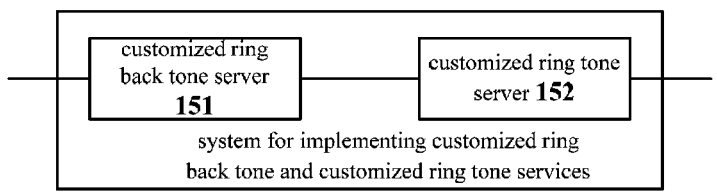
FIG. 12 illustrates an embodiment of a system for implementing customized ring back tone service and customized ring tone service provided by the present invention.

The present invention further provides an embodiment of a system for implementing customized ring back tone service and customized ring tone service. As shown in FIG. 12, the system comprises a customized ring back tone server 151 and a customized ring tone server 152. The customized ring tone server receives a first early media response returned by a calling terminal, wherein the first early media response comprises a first media negotiation result which is obtained by a terminal performing media negotiation with the customized ring back tone server according to the first early media request; the customized ring tone server generates a second early media request according to the received first early media response, and sends the first early media response and the second early media request, wherein the second early media request comprises a second attribute identification for identifying the second early media request; and the customized ring back tone server completes media negotiation with the calling terminal according to the first early media response, and the customized ring tone server completes media negotiation with a called terminal according to the second early media request comprising the second attribute identification.

In the embodiments of the present invention, the customized ring back tone server 151 further sends a first early media request to the calling terminal, wherein the first early media request comprises a first attribute identification for identifying the first early media request; the first early media response generated by the calling terminal comprises the first attribute identification; and the customized ring back tone server 151 identifies according to the first attribute identification in the first early media response that the first early media response is a response to the first early media request, and completes media negotiation with the calling terminal according to the first early media response.

It is possible, through the embodiments of the present invention, to enable a network element such as a customized ring back tone server or a customized ring tone server to very easily identify the two SDPs simultaneously contained in a received request, and identify the service that belongs to the services needed to be processed by the server itself on the basis that the existing SIP and SDP protocols are not extended. When the customized ring back tone service and the customized ring tone service coexists, and both of the services are provided with the early session mode, the customized ring back tone server can perform normal media transmission of customized ring back tone with the calling terminal, and the customized ring tone server can perform media transmission with the called terminal.

As can be known to persons ordinarily skilled in the art on perusal of the present application, the entire or partial steps in the aforementioned methods can also be implemented by a program that instructs relevant hardware, and the program can be stored in such a computer-readable storage medium as an ROM, an RAM or an optical disk, etc.

To sum it up, the above are merely directed to preferred embodiments of the present invention, rather than used to restrict the protection scope of the present invention. Any modification, equivalent substitution and improvement, etc made within the spirits and principles of the present invention shall all fall within the protection scope of the present invention.

What is claimed is:

1. A method for implementing customized ring back tone service and customized ring tone service, comprising:
    receiving, by a second server, a first early media response returned by a terminal, wherein the first early media response comprises a first media negotiation result which is obtained by the terminal performing media negotiation with a first server according to a first early media request;
    generating, by the second server, a second early media request according to the received first early media response, wherein the second early media request comprises a second attribute identification for identifying the second early media request, and sending the first early media response and the second early media request; and
    completing, by the first server, media negotiation with a calling terminal according to the first early media response, and a called terminal completing media negotiation with the second server according to the second early media request comprising the second attribute identification.

2. The method for implementing customized ring back tone service and customized ring tone service according to claim 1, wherein both the first early media request and the first early media response comprise a first attribute identification for identifying the first early media request or the first early media response.

3. The method according to claim 1, wherein the completing, by the first server, the early media negotiation with the calling terminal according to the first early media response comprises:
    parsing, by the first server, the received first early media response and the second early media request, identifying that the first early media response does not comprise the second attribute identification, and completing early media negotiation with the calling terminal according to the first early media response.

4. The method according to claim 2, wherein the completing, by the first server, the early media negotiation with the calling terminal according to the first early media response comprises:
    the first server parsing the received first early media response and the second early media request, identifying the first early media response comprising the first attribute identification, and completing the early media negotiation with the calling terminal according to the first early media response.

5. The method for implementing customized ring back tone service and customized ring tone service according to claim 1, wherein the first early media request is carried in a first reliable response message, the first early media response is carried in a first confirmation message, the second early media request is carried in a second confirmation message, and the method further comprises:
    sending, by the first server, the first reliable response message to the second server according to a media request response message returned by the called terminal, wherein the first reliable response message carries therewith the first early media request;
    sending, by the second server, the first reliable response message to the calling terminal, and the calling terminal performing the media negotiation with the first server according to the first early media request in the first reliable response message, and returning the first confirmation message to the second server, wherein the first confirmation message comprises the first early media response, and the first early media response is a result of media negotiation between the calling terminal and the first server;
    receiving, by the second server, the confirmation message returned by the calling terminal, and sending the second confirmation message to the first server according to the first confirmation message, wherein the second confirmation message comprises the first early media response and the second early media request, the second early media request comprises the second attribute identification for identifying the second early media request for media negotiation between the second server and the called terminal; and
    completing, by the first server, early media negotiation with the calling terminal according to the first early media response, and the called terminal completing early media negotiation with the second server according to the second early media request of the second attribute identification.

6. The method according to claim 5, wherein the receiving, by the second server, the confirmation message returned by the calling terminal, and sending the second confirmation message to the first server according to the confirmation message comprises:

receiving, by the second server, the first confirmation message returned by the calling terminal, wherein the first confirmation message comprises the first early media response;

adding, by the second server, the second early media request in the first confirmation message, and adding the second attribute identification in the second early media request to generate the second confirmation message; and sending the second confirmation message to the first server.

7. The method according to claim 5, wherein the sending, by the first server, the first reliable response message to the second server according to the media request response message returned by the called terminal comprises:

receiving, by the first server, the media request response message returned by the called terminal;

adding the first early media request in the response message, and adding the first attribute identification in the first early media request to generate the first reliable response message; and sending the first reliable response message to the second server.

8. The method according to claim 1, wherein the second attribute identification is used for identifying a media stream directional attribute or a session name.

9. A server for implementing customized ring back tone service, comprising:

a terminal interacting unit, configured to perform message interaction with a terminal;

a server interacting unit, configured to perform message interaction with a server; and a processor, configured to instruct the server interacting unit to send a first early media request for performing media negotiation with the terminal, parse a first early media response for the first early media request according to the first early media response and a second early media request received from a customized ring tone server by the server interacting unit, and complete media negotiation with a calling terminal according to the first early media response, wherein the first early media response comprises a first media negotiation result which is obtained by the terminal performing media negotiation with the server for implementing customized ring back tone service according to the first early media request, wherein the first early media response is received by the customized ring tone server from the terminal, the second early media request is generated by the customized ring tone server according to the received first early media response, and the first early media response and the second early media request is sent by the customized ring tone server, wherein the second early media request comprises a second attribute identification for identifying the second early media request, and wherein a called terminal completes media negotiation with the customized ring tone server according to the second early media request comprising the second attribute identification.

10. The server for implementing customized ring back tone service according to claim 9, wherein the processor comprises a first reliable response message generating module, a parsing module, and a media negotiating module, wherein the first reliable response message generating module is configured to add the first early media request in a message sent by a receiving terminal, and add a first attribute identification in the first early media request to generate a first reliable response message;

the parsing module is configured to parse the first early media response for performing media negotiation in a confirmation message according to the first attribute identification; and the media negotiating module is configured to complete media negotiation with the terminal according to the first early media response.

11. The server for implementing customized ring back tone service according to claim 9, wherein the processor comprises a first reliable response message generating module, a parsing module, and a media negotiating module, wherein the first reliable response message generating module is configured to add the first early media request in a message sent by a receiving terminal to generate a first reliable response message;

the parsing module is configured to parse the first early media response for performing media negotiation in a confirmation message according to the second attribute identification in the second early media request in the confirmation message; and the media negotiating module is configured to complete media negotiation with the terminal according to the first early media response.

12. A terminal for implementing customized ring back tone service and customized ring tone service, comprising:

a server interacting unit, configured to perform message interaction with a server; and a processing unit, configured to perform media negotiation according to an early media request received by the server interacting unit from a server to obtain a media negotiation result, send an early media response via the server interacting unit, and complete the media negotiation, wherein the early media response comprises the media negotiation result, wherein the server interacting unit receives a first early media request for performing media negotiation with the terminal from a customized ring back server, returns a first early media response to a customized ring tone server, the first early media response comprises a first media negotiation result which is obtained b the terminal performing media negotiation with the customized ring back server according to the first early media request, wherein the customized ring tone server receives the first early media response from the terminal, generates a second early media request according to the received first early media response and sends the first early media response and the second early media request wherein the second early media request comprises a second attribute identification for identifying the second early media request, wherein a called terminal completes media negotiation with the customized ring tone server according to the second early media request comprising the second attribute identification, and wherein the customized ring back server parses the first early media response for the first early media request according to the first early media response and a second early media request received from the customized ring tone server, and completes media negotiation with the terminal according to the first early media response.

13. The terminal for implementing customized ring back tone service according to claim 12, wherein the processing unit comprises:

a media negotiating unit, configured to perform media negotiation according to the early media request received by the server interacting unit from the server to obtain the media negotiation result; and an early media response generating unit, configured to generate the early media response according to an attribute identification in the early media request.

14. A customized ring back server for implementing customized ring tone service, comprising:
    a terminal interacting unit, configured to perform message interaction with a terminal;
    a server interacting unit, configured to perform message interaction with a server; and
    a processor, configured to generate a second early media request according to a first early media response sent by the terminal when the terminal interacting unit receives the first early media response, send the first early media response and the second early media request via the server interacting unit, and complete media negotiation by a called terminal with the server for implementing customized ring tone service according to the second early media request, wherein the second early media request comprises a second attribute identification for identifying the second early media request,
    wherein the first early media response comprises a first media negotiation result which is obtained by the terminal performing media negotiation with a customized ring back server according to a first early media request, the customized ring back server completes media negotiation with calling terminal according to the first early media response.

15. The server for implementing customized ring back tone service and customized ring tone service according to claim 14, wherein the processor comprises a message generating module and a media negotiating module, wherein
    the message generating module is configured to generate a message according to the first early media response sent by the terminal, wherein the message comprises the first early media response and the second early media request; and
    the media negotiating module is configured to perform media negotiation with the terminal.

16. A system for implementing customized ring back tone service and customized ring tone service, comprising a customized ring back tone server and a customized ring tone server, wherein
    the customized ring tone server is configured to receive a first early media response returned by a calling terminal, wherein the first early media response comprises a first media negotiation result which is obtained by a terminal performing media negotiation with the customized ring back tone server according to the first early media request;
    the customized ring tone server is configured to generate a second early media request according to the received first early media response, and send the first early media response and the second early media request, wherein the second early media request comprises a second attribute identification for identifying the second early media request; and
    the customized ring back tone server is configured to complete media negotiation with the calling terminal according to the first early media response, and the customized ring tone server is configured to complete media negotiation with a called terminal according to the second early media request comprising the second attribute identification.

17. The system for implementing customized ring back tone service and customized ring tone service according to claim 16, wherein the customized ring back tone server sends a first early media request to the calling terminal, wherein the first early media request comprises a first attribute identification for identifying the first early media request;
    the first early media response generated by the calling terminal comprises the first attribute identification; and
    the customized ring back tone server is configured to identify according to the first attribute identification in the first early media response that the first early media response is a response to the first early media request, and complete media negotiation with the calling terminal according to the first early media response.

* * * * *

UNITED STATES PATENT AND TRADEMARK OFFICE
CERTIFICATE OF CORRECTION

PATENT NO. : 8,908,845 B2  
APPLICATION NO. : 13/568742  
DATED : December 9, 2014  
INVENTOR(S) : Li et al.

Page 1 of 1

It is certified that error appears in the above-identified patent and that said Letters Patent is hereby corrected as shown below:

*In the Claims*

Claim 12, column 26, line 40:

"media negotiation result which is obtained b the terminal" should read

"media negotiation result which is obtained by the terminal"

Signed and Sealed this
Seventeenth Day of November, 2015

Michelle K. Lee
*Director of the United States Patent and Trademark Office*